United States Patent
Yamaguchi et al.

(10) Patent No.: US 7,841,577 B2
(45) Date of Patent: Nov. 30, 2010

(54) COMPOSITE OF ALUMINUM MATERIAL AND SYNTHETIC RESIN MOLDING AND PROCESS FOR PRODUCING THE SAME

(75) Inventors: Takashi Yamaguchi, Fujisawa (JP); Minobu Yamaguchi, Fujisawa (JP); Akiko Uematsu, Kitakoma-gun (JP); Masao Yamaguchi, Yokohama (JP); Yasuo Yamaguchi, Yokohama (JP)

(73) Assignee: Corona International Corporation, Fujisawa-shi (JP)

( * ) Notice: Subject to any disclaimer, the term of this patent is extended or adjusted under 35 U.S.C. 154(b) by 369 days.

(21) Appl. No.: 10/539,884

(22) PCT Filed: Dec. 12, 2003

(86) PCT No.: PCT/JP03/15923

§ 371 (c)(1),
(2), (4) Date: Jun. 16, 2005

(87) PCT Pub. No.: WO2004/055248

PCT Pub. Date: Jul. 1, 2004

(65) Prior Publication Data

US 2006/0055084 A1 Mar. 16, 2006

(30) Foreign Application Priority Data

Dec. 16, 2002 (JP) ............................. 2002-363770

(51) Int. Cl.
*B29C 45/14* (2006.01)
*B32B 15/08* (2006.01)
*C25D 11/04* (2006.01)

(52) U.S. Cl. .................. 249/135; 249/114.1; 428/304.4; 428/308.4; 428/472.2; 428/626; 428/702; 264/274; 264/328; 264/16; 264/338; 205/316; 205/324; 205/325

(58) Field of Classification Search ...... 249/114.1–116, 249/134–135; 425/812, 522, 542; 264/338, 264/328.16, 274; 205/106, 324, 50; 106/38.2, 106/38.22, 38.3; 428/304.4, 308.4, 340.4, 428/410, 472.2, 613, 626, 650, 654, 689, 428/702, 935

See application file for complete search history.

(56) References Cited

U.S. PATENT DOCUMENTS 2,647,079 A * 7/1953 Burnham .................... 205/175

(Continued)

FOREIGN PATENT DOCUMENTS

EP 0 866 108 A1 9/1998

(Continued)

OTHER PUBLICATIONS

Xue et al., "Evaluation of the mechanical properties of microarc oxidation coating and 2024 aluminum alloy substrate", Oct. 25, 2002, Institute of Physic Publishing, Condensed Matter 14 (2002) 10947-10952.*

*Primary Examiner*—Philip C Tucker
*Assistant Examiner*—Dimple N Bodawala
(74) *Attorney, Agent, or Firm*—Edwards Angell Palmer & Dodge LLP

(57) ABSTRACT

A process for producing a composite of aluminum material and synthetic resin molding with high efficiency; and a stable fast composite exhibiting high peeling resistance and large mechanical strength. The process is characterized in that aluminum material (1) is anodized in electrolytic bath of phosphoric acid or sodium hydroxide to thereby form anodic oxidation coating (2) provided with innumerable pores (3) having a diameter of 25 nm or more made open in the surface thereof is formed thereon, and a synthetic resin mold (6) is coupled with the anodic oxidation coating (2) in such a condition that the portion (6a) of the synthetic resin molding (6) is intruded or anchored in the innumerable pores (3) of the anodic oxidation coating (2). By this process, composite (P) with the above properties can be easily obtained.

20 Claims, 15 Drawing Sheets

U.S. PATENT DOCUMENTS

| | | | | |
|---|---|---|---|---|
| 3,704,176 A | * | 11/1972 | Oga et al. | 428/422 |
| 3,775,266 A | * | 11/1973 | Ikeda et al. | 205/201 |
| 3,785,946 A | * | 1/1974 | Shiro et al. | 205/188 |
| 4,413,966 A | * | 11/1983 | Mills et al. | 425/84 |
| 4,531,705 A | * | 7/1985 | Nakagawa et al. | 249/134 |
| 4,968,389 A | * | 11/1990 | Satoh et al. | 205/106 |
| 5,151,237 A | | 9/1992 | Hettinga | 264/257 |
| 5,407,342 A | * | 4/1995 | Boucher et al. | 425/145 |
| 5,516,470 A | * | 5/1996 | Larsson | 264/39 |
| 5,756,406 A | * | 5/1998 | Rittman et al. | 442/117 |
| 5,866,025 A | * | 2/1999 | Kataoka et al. | 249/114.1 |
| 6,066,392 A | * | 5/2000 | Hisamoto et al. | 428/304.4 |
| 6,444,304 B1 | * | 9/2002 | Hisamoto et al. | 428/319.1 |
| 6,565,984 B1 | * | 5/2003 | Wu et al. | 428/472.2 |
| 6,818,118 B2 | * | 11/2004 | Kinlen et al. | 205/317 |
| 6,982,217 B2 | * | 1/2006 | Imada et al. | 438/584 |
| 2002/0109134 A1 | * | 8/2002 | Iwasaki et al. | 257/13 |
| 2002/0130441 A1 | * | 9/2002 | Robinson et al. | 264/442 |
| 2006/0055084 A1 | * | 3/2006 | Yamaguchi et al. | 264/328.16 |
| 2006/0192309 A1 | * | 8/2006 | Fukutani et al. | 264/1.21 |

FOREIGN PATENT DOCUMENTS

| | | |
|---|---|---|
| EP | 1 306 467 A1 | 5/2003 |
| JP | 1-205093 | 8/1989 |
| JP | 5-51794 | 3/1993 |
| JP | 5-285976 | 11/1993 |
| JP | 9-300359 | 11/1997 |
| JP | 11-91034 | 4/1999 |
| JP | 2001-172795 | 6/2001 |
| JP | 2001-225348 | 8/2001 |
| JP | 2001-315159 | 11/2001 |
| JP | 2002-302795 | 10/2002 |

* cited by examiner (a)

(b)

(c)

(d)

(a)

(b)

(c)

(d)

(a)

(b)

(c)

(d)

COMPOSITE OF ALUMINUM MATERIAL AND SYNTHETIC RESIN MOLDING AND PROCESS FOR PRODUCING THE SAME

TECHNICAL FIELD

The present invention relates to a stable and fast composite which is excellent in peel strength by strongly coupling a synthetic resin molding with an aluminum material, and a process for production thereof.

BACKGROUND ART

It has been hitherto disclosed as an invention on an aluminum composite, for example, the Japanese Unexamined Patent Publication No. 05-05179, which discloses such a process for producing an aluminum composite that a particulate of polytetrafluoroethylene is electrochemically or chemically adsorbed on a surface of an anode-oxidized coated film of aluminum or an aluminum alloy, and after dried, it is lapped with an opposite material, so that an aluminum composite which is excellent in friction and wear property and baking resistance is produced. This disclosed reference is, in other words, the publication disclosing the invention of a surface treating method for treating the surface of aluminum in which the lubricant film is formed on the surface of the anodic oxidation coating of the aluminum.

Further, there is disclosed in the Japanese Unexamined Patent Publication No. 2001-172795, the inventions on an aluminum composite reduced in discharging gas and particles and improved in insulation and corrosion resistance and on a method for surface-treating the aluminum composite, in which a polysilazane solution is applied on the surface of the aluminum composite with an acidic oxide film formed on a substrate formed from aluminum or aluminum alloy, dried and baked to surface-treat the composite.

Thus, those inventions disclosed in these cited references are directed to a method for surface-treating the aluminum material, and are not directed to such a composite of aluminum material formed from aluminum or aluminum alloy raw material by applying it to an anodic oxidization treatment, and an synthetic resin molding that is strongly bonded together, and a process for producing the composite, which are the purpose of the present invention as will be described below in detail.

In the meantime, the conventional production of a composite of aluminum material and a synthetic resin molding is not only troublesome, but also there is not obtained a safe and fast composite which is large in a mechanical strength and of which the overall surfaces of the two constructional members thereof are bonded together.

Further, it has been hitherto carried out that using a conventional metal mold for insert molding, a composite is produced in such a manner that a portion of a metallic component made of iron or steel is inserted into the cavity of the metal mold, and while being held under this inserted condition, molten synthetic resin is injected into the cavity, so that a composite in which the portion of the metal component is inserted in a synthetic metal molding in a predetermined shape is produced.

However, in the case where the metallic component is made of aluminum raw material, because the surface thereof is the metallic one of aluminum or an aluminum alloy, and because coefficient of linear expansion of the synthetic resin to be molded by the insert molding and that of the aluminum are much different, it is difficult to produce a composite thereof.

Now, as generally known, production of assembled products of various electric and electronic parts of personal computers, digital cameras, pocket telephones, fittings for chassis or the like, electric and electronic containers such as casings or covers containing electric apparatus or electronic apparatus, and various kinds of parts for buildings, various kinds of parts such as ornamental parts for fitting to the inside or outside of motorcars, is performed by assembling an aluminum work prepared by previously press working a sheet of aluminum into a desired shape such as a predetermined case or cover, and a synthetic resin molding together by various assembly means to produce a composite. More in detail, some examples of the conventional composites are produced as follows. For instance, it is produced by stacking a press-worked aluminum plate and a synthetic resin mold each other through a pressure sensitive adhesive double coated tape. Alternatively, it is produced in such a process that a worked aluminum plate having a large number of caulking claws arranged on both side edges of the aluminum plate is manufactured, and a synthetic resin mold is placed on the aluminum plate, and in this state, the large number of the claws are inwardly bent on the surface of the synthetic resin mold. Further, alternatively, in stead of assembling them together by caulking of the large number of the claws, it is produced by fastening the mutually stacked members together using screws.

A composite as shown in FIG. 20 is a cover for a switch box showing one example of the former. This composite is produced as follows. Namely, after the container of a worked aluminum A shaped by press working a sheet of aluminum into the cover having at its center a hole for passing distributing electric wires, and a synthetic resin molding B formed by an injection molding process are prepared separately, the rear surface of the aluminum cover A and the flat surface of the synthetic resin mold B are overlapped with each other through a pressure sensitive adhesive double coated tape C and adhered together by pressing, so that a composite thereof is produced.

In addition, in the case of fitting synthetic resin made studs, which is used for mounting a chassis for an electric apparatus, and to the inner surface of the aluminum cover or case, so as to produce a composite of the two component, it is a conventional method that the two components are adhered together through an adhesive.

Thus, the conventional processes for production of composites each composed of an aluminum material and a synthetic resin mold requires such steps that the formed aluminum plate by press working and the synthetic resin mold are respectively made previously, and the two components are then assembled together by the above mentioned various joining means, so that it takes much time and troublesome in production thereof, resulting in lowering the production efficiency and increasing the manufacturing costs. Further, among the composites produced, the ones produced using the pressure sensitive adhesive double coated tape or an adhesive agent, there is brought about deterioration of the quality of the adhesive agent with the lapse of time and weakening the strength thereof. And, the ones assembled by caulking or screwing them together are not bonded together extensively or completely between the mutually opposite surfaces thereof, so that there is brought about such problems that the mechanical strength of the composites is weak as a whole, and is unreliable against vibrations and impact, so that a stable and fast composites can not be obtained.

Further, in the case of producing the composite produced by a so-called casting using a metal mold for injection-molding, in which a portion of the aluminum material is inserted into the cavity of the metal mold, so that there is brought about such inconveniences that a tensile strength of the joint portion between the synthetic resin molding and the inserted portion of the aluminum material is weak and is peeled from reach other by vibrations and impact to become shaky.

Accordingly, in view of the above-mentioned conventional problems, the purpose of the present invention is to produce at high efficiency and economically a stable and fast composite which, without requirement of the pressure sensitive adhesive doubled coated tape, adhesives, binding members such as a screw and a step of assembling of the two members, the mutually opposite surfaces of an aluminum material of any desired shape and size made of aluminum or aluminum alloy and a synthetic resin mold of any desired shape and size are bonded together strongly over the whole surfaces thereof to become large in peel resistance.

To achieve this purpose, various tests, researches and trial and errors have been carried out, and as a result, the inventors have found that when an aluminum raw material is subjected to an anodic oxidization treatment so that an aluminum material provided with an anodic oxidation coating having a predetermined diameter of pores may be formed, thereby a synthetic resin material is very strongly coupled with the anodic oxidation coating of the aluminum material, so that a composite which is very large in peel resistance can be obtained.

More in detail, it has been found out, in the course of tests and studies, that in the test case where the surface of the aluminum raw material was subjected to an anodic oxidization treatment to be formed with the anodic oxidation coating in a sulfuric acid bath with an alternating current electrolysis or a direct current electrolysis, there was obtained the anodic oxidization coating provided with an innumerable number of surface opening pores of which the diameter of the majority of the surface open pores was about 10 nm. When the aluminum material having the anodic oxidation coating was then placed in a recess made in one of metal molds for injection molding, and the other metal mold provided with a cavity formed in a predetermined shape was closed, and molten synthetic resin was injected into the cavity to be filled therein under pressure, and after cooling, the closed metal molds were opened, and a resultant composite product was taken out.

When a tensile strength was applied to the synthetic resin mold of the composite, the synthetic resin molding was peeled off easily from the anodic oxidation coating of the aluminum raw material due to a small tensile strength. When the anodic oxidation coating was observed in order to study the cause thereof, it has been found that the surface open pores thereof are too small that the molten synthetic resin can not be invaded into the pores. Now, instead of the sulfuric acid bath, using an oxalic acid bath, a phosphoric acid bath, a sodium hydroxide bath etc, electrolysis by a direct current was carried out and there were obtained respective aluminum materials having respective anodic oxidation coatings, and for the respective aluminum raw materials, they were subjected to the foregoing injection molding using the foregoing metal mold for injection molding, so that respective composites in which the synthetic resin moldings were coupled with the respective anodic oxidation coatings of the respective aluminum raw materials. When the tensile strength was applied to teach of the respective synthetic resin moldings thereof, the composite using the oxalic acid bath was peeled easily. However, the composite using the phosphoric acid bath and the sodium hydroxide bath, the synthetic resin molds of the respective composites were not peeled off even by a very large tensile strength. Now, after the synthetic resin molds of the respective composites were cut off from the respective anodic oxidation coatings thereof, it was observed that the innumerable pores of the respective anodic oxidation coatings were filled with solidified synthetic resin. Thus, as a result of the comparative tests, it has been found out that if molten resin is invaded into at least most of the innumerable pores, not to mention all of the pores, in the time of the molding process, molten resin is invaded into these pores, and as a result of the solidification, a composite is produced in which the synthetic resin molding is coupled strongly with the aluminum raw material in such a condition that synthetic resin molding is intruded into the pores.

DISCLOSURE OF THE INVENTION

The present invention has been made in view of the above mentioned findings, and provides a composite of an aluminum material and a synthetic resin molding characterized in that part of the synthetic resin molding is coupled with an anodic oxidation coating of the aluminum material in such a condition that it is intruded into the innumerable pores having a diameter of 25 nm or more innumerably made open in the surface of the anodic oxidation coating.

This composite is large in the tensile strength of the synthetic resin molding resisting against peeling from the aluminum material and is stable and fast.

Further, the present invention is directed to a process for producing a composite of an aluminum material and a synthetic resin molding, and is characterized in that it comprises the steps: (a) soaking an aluminum raw material in a phosphoric acid or sodium hydroxide electrolytic bath, and applying to the surface thereof an anodic oxidization treatment by a direct current electrolysis to form an anodic oxidation coating having innumerable pores having 25 nm or more in diameter made in the surface thereof, and (b) then placing a portion or whole of the aluminum material with the anodic oxidation coating in a cavity made in a predetermined shape in a metal mold, and injecting molten synthetic resin toward a portion or whole of the exposed surface of the anodic oxidation coating in the cavity so that the molten synthetic resin may invade into the innumerable pores and also may be filled in the cavity under pressure to be molded.

According to this production process, the conventional assembling components or members and troublesome assembling works are disused, and the above-mentioned stable and fast composite can be obtained at a high efficiency and economically. When a tensile strength of each of the synthetic resin moldings of some composites produced according to the present invention was measured by a tensile tester, composites produced using the phosphoric acid, the tensile strength of the synthetic resins against the phosphoric acid anodic oxidation coatings thereof was 20 Kgf even the minimum, and the tensile strength thereof against the sodium hydroxide anodic oxidation coatings was 20 Kgf even the minimum, and thus, there were obtained the stable and fast composites that are large in tensile strength.

Further, in the case of the anodic oxidization treatment by phosphoric acid in the process for production of the foregoing composite according to the present invention, it is preferable to treat under the following conditions. Namely, the aluminum raw material is anodized in a phosphoric acid bath comprising an aqueous solution of phosphoric acid having the concentration range of 15-40% and the temperature range of 10-30° C., by applying direct current electrolysis for 5-25 minutes, at a voltage in the range of 20-100 V, and at a current density in the range of 0.5-2 A/dm$^2$, thereby an anodic oxidation coating having innumerable pores that are made open in the surface and have a diameter of 25 nm or more can be formed.

On the other hand, in the case of the anodic oxidization treatment by sodium hydroxide, it is preferable to treat under the following conditions. Namely, the aluminum raw material was anodized in a bath comprising an aqueous solution of sodium hydride having the concentration range of 0.05-0.3 mol, and the temperature range of 10-30° C., by applying a direct current electrolysis for 5-25 minutes, at a voltage in the range of 15-45 V, and at a current density in the range of 0.5-3 A/dm$^2$, thereby an anodic oxidation coating having innumerable pores that are made open in the surface and have a diameter of 25 nm or more can be formed.

In order to obtain the foregoing large tensile strength, it is not necessary that the diameter of all of the pores made open in the surface of the aluminum raw material has to be 25 nm or more, and if the diameter of the majority of the pores, specifically, about 85% or more of all the pores is 25 nm or more, a stable and fast composite having the foregoing large tensile strength can be obtained.

Incidentally, if the anodic oxidization treatment by the phosphoric bath or sodium hydroxide bath is carried out in the other anodic oxidization conditions than the foregoing respective anodic oxidization treatments, there is such inconveniences that destruction of the anodic oxidation coating is progressed by rising of the bath temperature, etc, and powders are gushed out or become like a film covering the anodic oxidation coating, so that bonding of the anodic oxidation coating of the aluminum material to the synthetic resin molding becomes impossible.

For production of the composite according to the present invention, a metal mold for injection molding, a metal mold for insert-molding, a co-extruding machine, a jig containing an electromagnetic induction heater may be employed.

Additional disclosure of the present invention will be made clear with reference to the below-mentioned embodiments of the present invention with reference to the accompanying drawings.

BRIEF DESCRIPTON OF THE DRAWINGS

FIG. 14(a)-(d) are sectional side views showing one embodiment of producing steps in producing a printed composite according to the present invention.

FIG. 15(a)-(d) are sectional side views showing another embodiment of producing steps in a process for producing a printed composite according to the present invention.

FIG. 16(a)-(d) are sectional side views showing further another embodiment of producing steps in producing a process for producing a printed composite according to the present invention.

Figure 17:
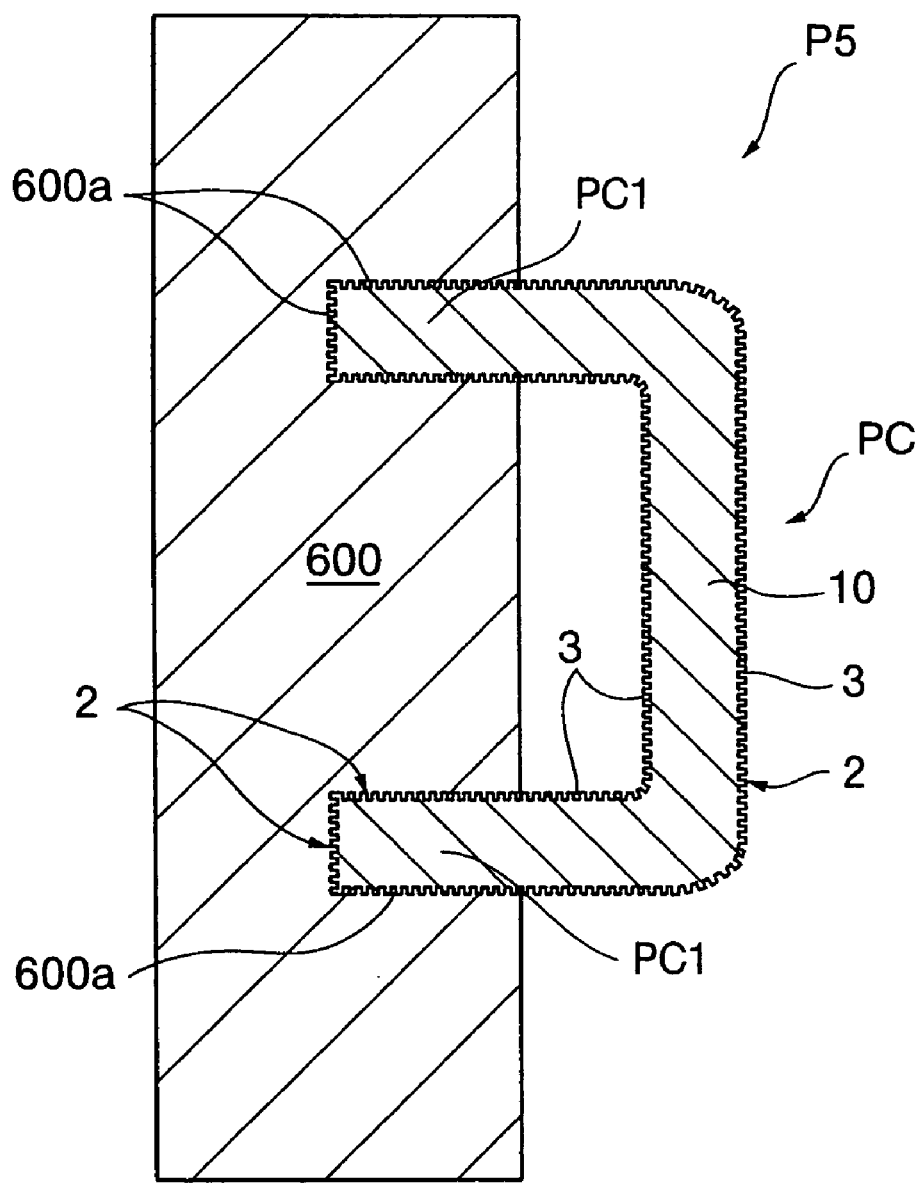

FIG. 17 is a vertical section of a further another embodiment of a composite of the present invention produced by an insert-molding process.

Figure 18:
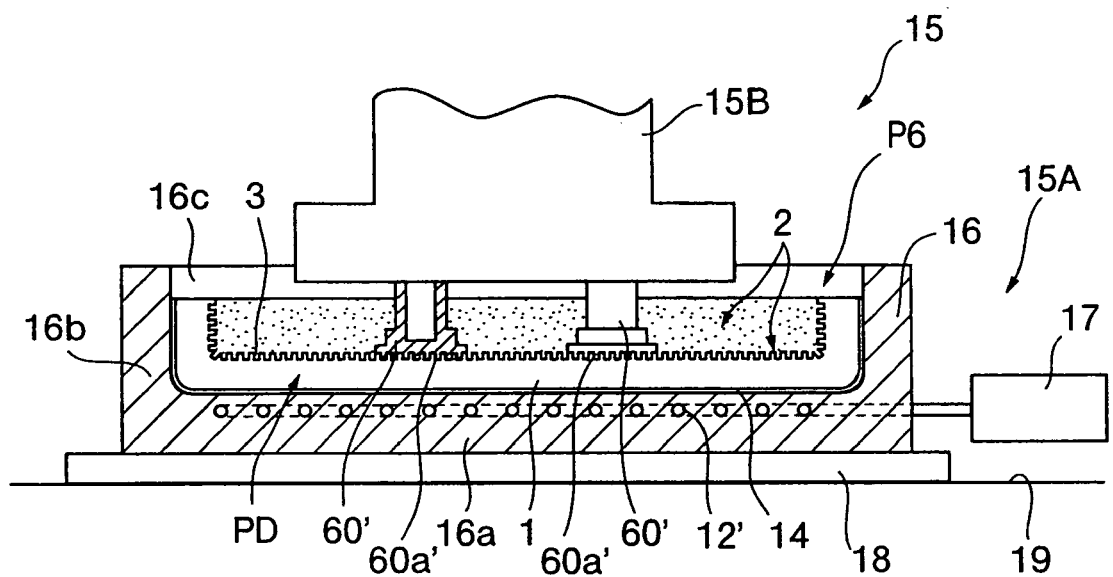

FIG. 18 is a sectional side view of a portion of a heating and pressing apparatus for showing a further another embodiment of a process for producing a composite according to the present invention.

Figure 19:
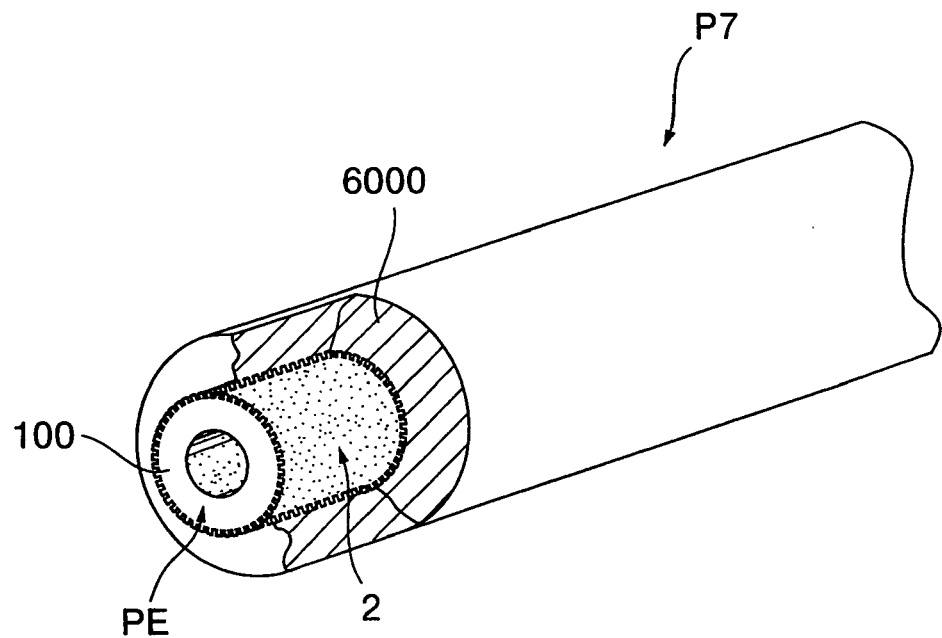

FIG. 19 is a perspective view of a composite produced by a further another embodiment of a process for production of a composite according to the present invention.

Figure 20:
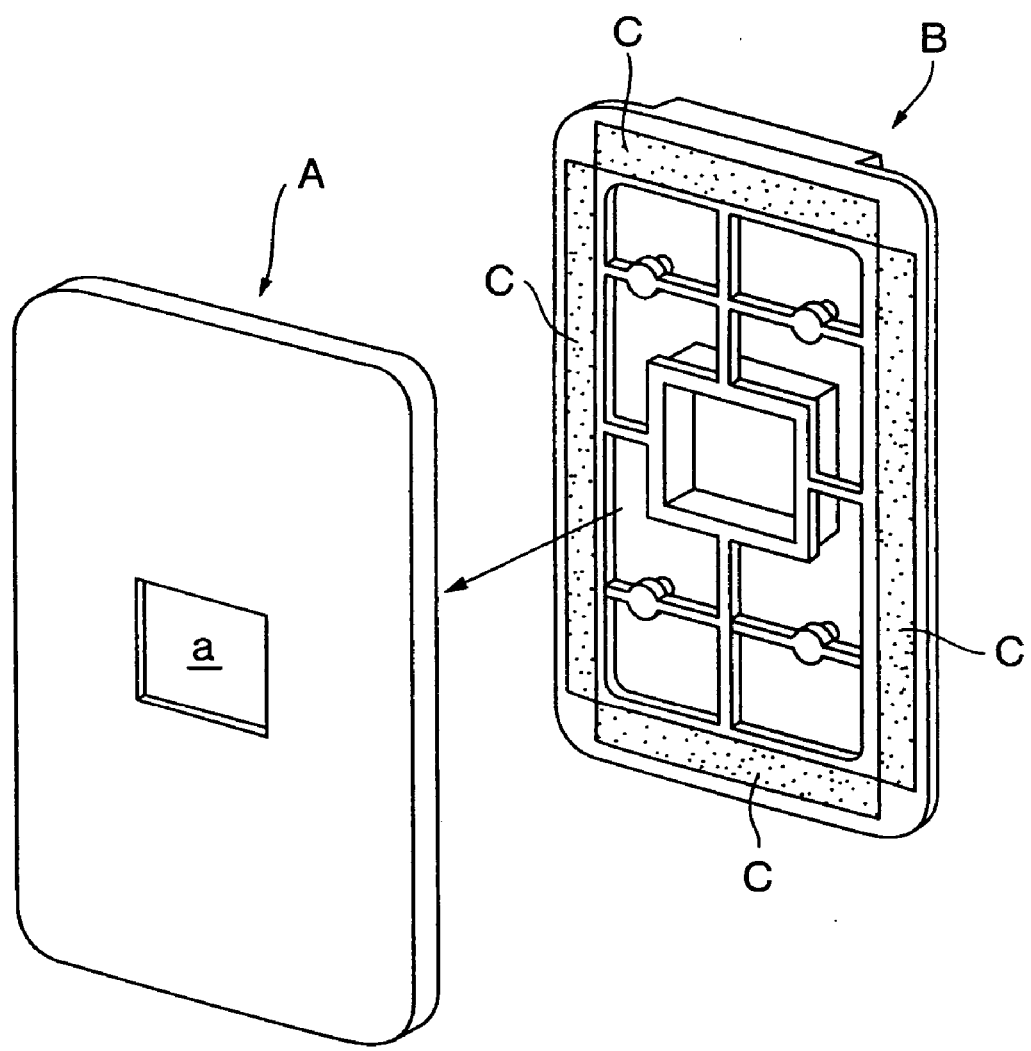

FIG. 20 is a dissembled perspective view of a conventional composite used for a cover for a switch box.

BEST MODE OF CARRING OUT THE INVENTION

The process for producing a composite of an aluminum material and a synthetic resin material according to the present invention is applicable in stead of all of such conventional marketed composites produced by assembling an aluminum material having a desired shape and a desired size and a synthetic resin mold having a desired shape and a desired size, using the foregoing conventional techniques, as parts or fittings of electric apparatus and electronic apparatus like personal computers, pocket telephones, or the like, interior or exterior equipments, parts of buildings, interior or exterior equipments of boats and ships, aircraft, railroad rolling stock, motor vehicles, and ornamental articles such as name plates, as produced using the foregoing conventional assembling techniques.

One embodiment of a process for producing a composite according to the present invention comprising, firstly, applying aluminum material raw material formed in a desired shape, to an anodic oxidization treatment to make aluminum material of which both surfaces are formed with an anodic oxidation coatings having innumerable pores of which at least greater part is 25 nm or more in diameter, and, secondly, injecting molten synthetic resin toward the anodic oxidation coating of the aluminum material using an injection molding device. As the injection molding device, an injection-molding device mold and an insert molding machine, are generally used.

Here, the term "at least greater part" in the expression "at least greater part of the innumerable pores is 25 nm or more" means about 85% or more, not to mention all of the pores.

And, as composite, various kinds of composites can be considered, for example, as mentioned below. Namely, an aluminum raw material in the shape of a plate, a solid one formed by bending the flat plate in two or three dimensions by press-working, or a worked aluminum raw material in the shape of a rod, column or tube and the like are used. And one side surface, both side surface or circumferential surface are formed with the anodic oxidation coating depending on the varied shapes of the respective aluminum raw materials. The synthetic resin molding is coupled with the part or the whole of at least one side surface of the anodic oxidation coatings thereof in such a condition that part of the synthetic resin is intruded in the innumerable pores thereof, so that the respective composites are produced. Further, alternatively, the synthetic resin mold is coupled, by the way as mentioned above, with the part or whole of one side surface of the anodic oxidation coatings formed on both side surfaces of the aluminum raw material, and the other surface of the aluminum material is applied with printing, so that a printed composite is produced. Furthermore, alternatively, the aluminum material with the anodic oxidation coatings on both sides thereof or the circumferential surface thereof is used as an insert member, and using an insert-molding device, a predetermined part of the insert member thereof is embedded in and bonded strongly to a formed synthetic resin mold in the condition as mentioned above, so that a composite by a so-called insert-molding process is produced. Furthermore, a composite produced by boding an aluminum material and a synthetic resin molding together by a heating and pressing process is produced as mentioned below.

Next, a basic process for producing a composite of an aluminum material and a synthetic resin will be explained with reference to the accompanying drawings.

1) Forming of an Anodic Oxidation Coating:

The purpose of the present invention can be achieved even by using either of aluminum or an aluminum ally as an aluminum raw material, but the following will be explained about the case where aluminum is used as an aluminum raw material.

EXAMPLE 1

An aluminum raw material comprising a plate having about 1-2 mm in thickness was used as an aluminum raw material, and was washed with an about 5% aqueous solution of phosphoric acid heated to 60° C. for cleaning the same, and was then soaked in a 20% aqueous solution of nitric acid to be neutralized, and was then washed.

Next, it was used as an anode in a phosphoric acid bath having a temperature in the range of about 18-20° C. and containing an about 30% aqueous solution of phosphoric acid in concentration, while an aluminum plate or a lead plate was used as a cathode, and electrolysis carried out for 20 minutes using a direct current and at a voltage in the range of 30 V-70 V, at a current density in the range of about 0.5-1 A/dm$^2$, so that a porous anodic oxidation coating having a depth of about 1-1.5µ was formed on the surface of the aluminum plate. The anodic oxidation coating, as well known, is composed of a porous layer of densely long and narrow pores made open in the surface and a thin minute insulation layer from the bottom of the porous layer to the metallic surface in the plate, as well known.

And, the diameter of the almost all of the open pores made in the surface as mentioned above was in the range of about 40-90 nm.

EXAMPLE 2

Instead of the phosphoric acid bath, using a sodium hydroxide bath, an anodic oxidation treatment was applied to the same aluminum raw material plate as that used in Example 1. Namely, as an electrolytic bath, that of a 0.2 mol aqueous solution of sodium hydride and with a temperature in the range of about 18-20° C. was used, and an electrolysis was carried out by a direct current process for about 20 minutes, at a voltage of 25V, at a current density of about 0.5 A/dm$^2$, and thereby a porous anodic oxidation coating of which almost all of the open pores are about 30-50 nm in diameter was formed.

Figure 1:
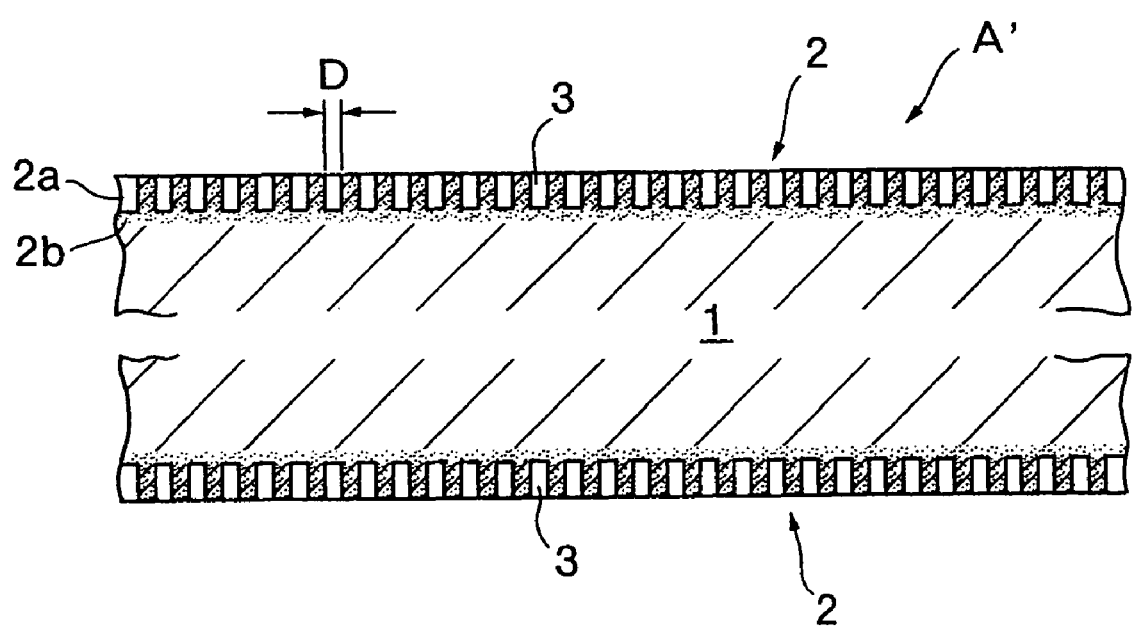
FIG. 1 is a schematic vertical section, partly omitted, of an aluminum material of which the surface is formed with an anodic oxidation coating by an anodic oxidization treatment on the surface of an aluminum raw material in order that the aluminum raw material may be adapted to use for producing a composite of the aluminum material and a synthetic resin molding according to the present invention.
Figure 2:
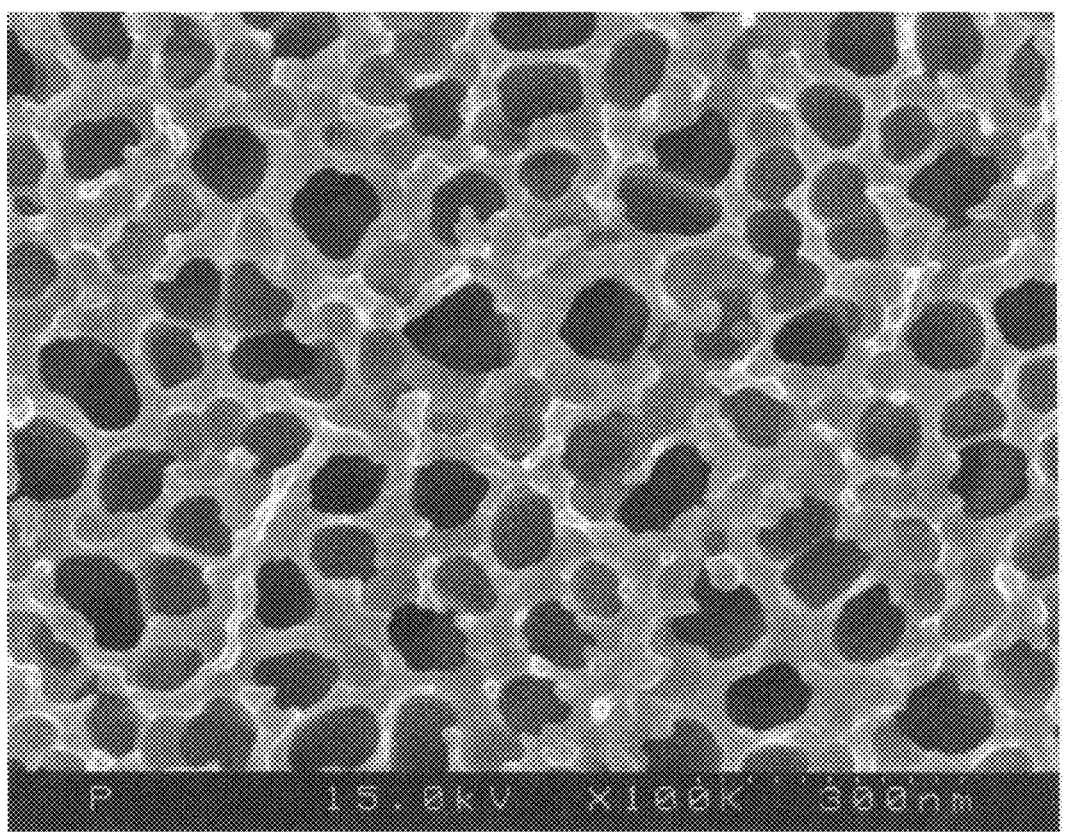
FIG. 2 is an electron microscopic photograph showing the surface of the anodic oxidation coating of the aluminum material as shown in FIG. 1.

The respective aluminum material plates formed with the respective anodic oxidation coatings thereon thus produced in FIG. 1 and FIG. 2 were then washed with an aqueous solution of nitric acid, and thereafter dried by a hot blast.

FIG. 1 is a schematic section of part of a plate-shaped aluminum material A' formed with the anodic oxidation coating on both side surfaces thereof produced in Example 1 or Example 2(hereinafter simply referred to "as an anodic oxidization treated plate A'"). The thickness of the anodic oxidization treated plate A' is 1 mm, but the intermediate portion thereof is omitted in the same Figure. A reference symbol 2 denotes the anodic oxidation coating, 2a denotes the porous layer having innumerable pores 3 and 2b denotes the insulation layer. A symbol D indicates the diameter of the pore 3. FIG. 2 is an electron microscopic photograph showing the surface of the phosphoric acid anodic oxidation coating 2 of the anodic oxidation treated plate A' produced in Example 1.

And, it has been recognized that the anodic oxidization treated plate A comprising the porous anodic oxidation coating 2 having the innumerable pores in which at least almost all thereof is 25 nm or more in diameter can be obtained Further, as is clear from comparison between Example 1 and Example 2, it has been found that when the electrolysis time is the same, the phosphoric acid bath is more advantageous than the sodium hydroxide bath, because the larger diameter of the pores can be obtained in the shorter time.

Furthermore, when the electrolysis time used in Example 1 was shorten to 3 minutes, an anodic oxidation coating plate in which most of the pores formed therein were in the rang of 25-30 nm in diameter was obtained.

Furthermore, incidentally, when the electrolysis time used in Example 1 and Example 2 was elongated to 30 minutes, powders were gushed out at the surface of the anodic oxidation coating and is grown to a film and covers or fills in the innumerable pores, and consequently hinders molten synthetic resin from invading into the pores, so that the strong bonding of the anodic oxidation coating thereof with the synthetic resin molding was made impossible. Conversely, when the electrolysis time used in Example 1 was shorten to 1 minute, and that used in Example 2 was shortened to 3 minutes, the pores having a diameter of 25 nm or more are hardly obtained, and molten synthetic resin was hardly invaded into the pores, so that the strong bonding of the anodic oxidation coating with the synthetic resin mold was not obtained.

2) Production of a Composite by an Injection Molding:

The anodic oxidization treated plate A' according to of the present invention produced as mentioned above and as shown in FIG. 1 in which most of the pores 3 of the anodic oxidation coating 2 are 25 nm or more in diameter was fitly mounted in a metal mold for injection molding, for instance, a mold for in-molding and molten synthetic resin is injected into a desired-shaped cavity of the metal mold so as to be invaded into the innumerable pores and be filled in the cavity under pressure for forming the synthetic resin molding having a predetermined shape, and, from this condition, the metallic mold is cooled to be solidified, and thus there can be produced a composite of the present invention in which the synthetic resin molding is so strongly coupled with the anodic oxidation coating 2 of the aluminum treated plate A' that part of the synthetic resin mold is intruded in the innumerable pores 3, 3, . . . . Embodying examples according to the present invention will be explained with reference to FIG. 3 and FIG. 4.

Figure 3:
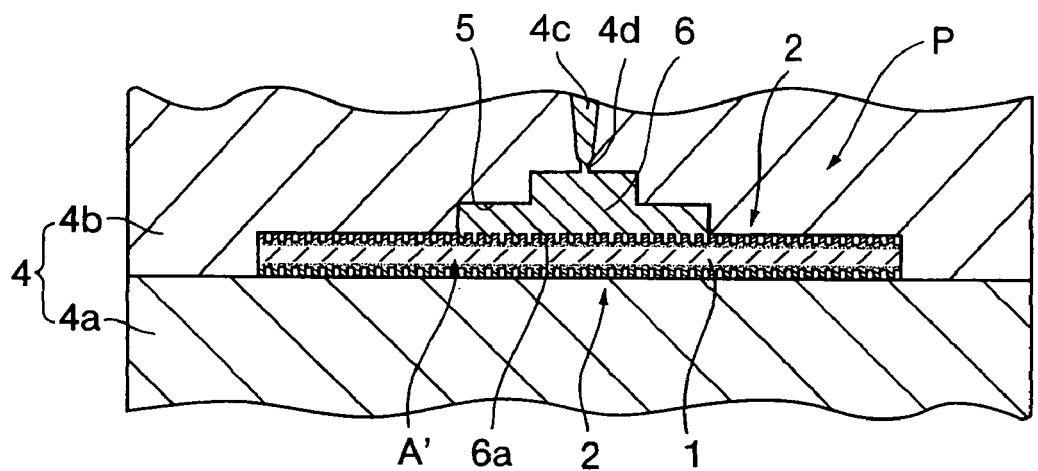
FIG. 3 is a vertical section for explaining one embodiment of a process for producing a composite according to the present invention in which the aluminum material formed with the anodic oxidation coating as shown in FIG. 1 is placed in metal molds, and a synthetic resin molding is coupled with a portion of the anodic oxidation coating in the condition that it intruded therein.
Figure 5:
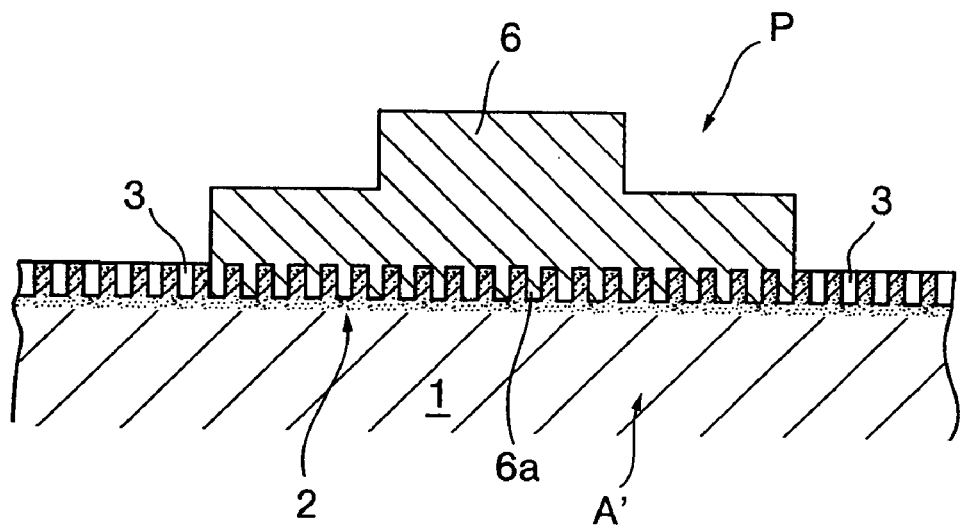
FIG. 5 is a schematic vertical section of a portion of a composite of the present invention produced by the embodiment as shown in FIG. 1.

The embodying example as shown in FIG. 3 used a pair of metal molds for injection molding 4. Namely, there was used such an injection molding that the anodic oxidation treated plate A as shown in FIG. 1 is placed on the upper surface of one side metal mold 4a thereof, and the lower surface of the other side metal mold 4b which faces the metal mold 4a is formed with a recessed space for housing the anodic oxidization treated plate A' and with such a cavity 5 in a predetermined shape that is positioned above the recessed space and faces a partial area of the surface of the anodic oxidation coating 2 of the anodic oxidization treated plate A' housed therein, for instance, the central area of the surface of the coating 2. Under the closed condition of the upper and lower metal molds 4a and 4b as shown in FIG. 3, molten synthetic resin supplied from the outside is injected into the cavity 5 through a sprue 4c from a pinpoint gate 4d and is filled in the cavity 5 under pressure. Whereupon, part of the molten synthetic resin is forcibly invaded into the faced innumerable pores 3 of the anodic oxidation coating 2, and at the same time the remainder greater part of the molten synthetic resin is filled in the cavity 5. Next, the molten synthetic resin is solidified by cooling water passing through the metal molds, though not shown. Thus, A composite P of an anodic oxidization treated plate A' and a synthetic resin molding 6 as shown in FIG. 5 is obtained. The composite P as shown in the same Figure, is obtained as a product having a large peel strength in such a coupled condition that the lower portion 6a of the synthetic resin mold 6 is intruded in the innumerable pores 3 of the anodic oxidization treated plate A'.

In the process for production of this composite, it is preferable that the metal molding machine 4 is provided with a heater and the above mentioned injection molding process is carried out by heating the molds by the heater. Thereby, the mutually coupling of the molten synthetic resin and the heated anodic oxidization treated plate A' can be facilitated. And, it is sufficient that a molding pressure at the time of the injection molding is about 700 Kg or more. Normally, it is in general and preferable that the injection molding work is carried out at a temperature in the range of 90-180° C. and at a molding pressure in the range of 700-1200 Kg.

As for synthetic resin materials, various kinds such as PP. PE, PBT, ABS, PPS etc. may be used, and it has been confirmed that, regardless of kinds thereof, there can be obtained the composite P in which the synthetic resin mold 6 and the anodic treated plate A are strongly bonded together.

In stead of the production of the composite P in which the synthetic resin mold 6 is coupled with the portion of the surface of the anodic oxidation coating 2 of the anodic oxidization treated plate A', a composite in which a synthetic resin mold is coupled with a whole surface of the anodic oxidation coating of the anodic oxidization treated plate A' may be produced.

Figure 4:
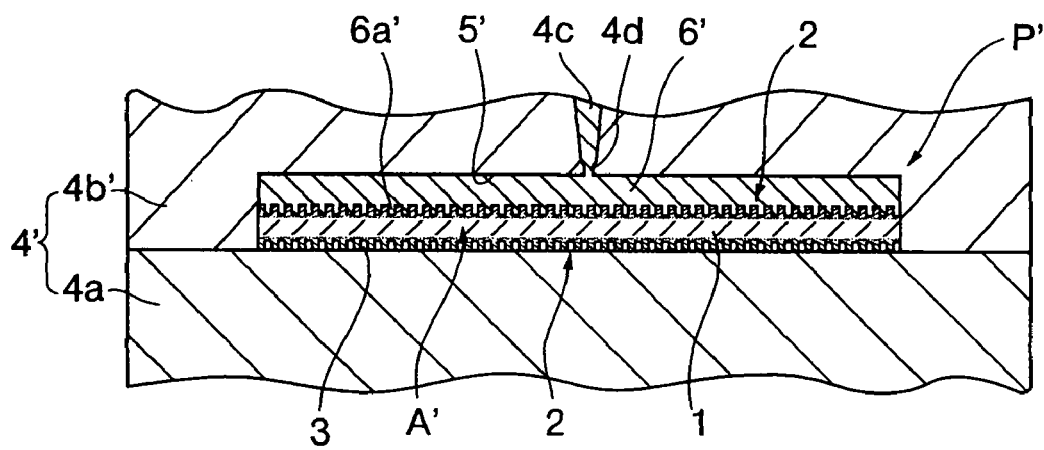
FIG. 4 is a vertical section for explaining another embodiment of a process for producing a composite according to the present invention in which the aluminum material formed with the anodic oxidation coating as shown in FIG. 1 is placed in the metal molds, and a synthetic resin molding is coupled with the whole surface of the anodic oxidation coating in the condition it is intruded therein.

FIG. 4 shows one example of producing the composite as mentioned above.

Namely, metal molds for injection molding 4' as shown in FIG. 4 is used. A metal mold on one side thereof having the same in construction as the foregoing metal mold 4a is used, but as the other metal mold facing the metal mold 4a there is used a metal mold 4b' that is formed, at its lower surface, with a recessed space for housing the anodic oxidization treated plate A' placed on the metal mold 4a and such a cavity 5' in a predetermined shape that faces the whole of the surface of the anodic oxidation coating 2 of the anodic oxidization treated plate A'. In the mutually closed condition of both the metal molds 4a and 4b', molten synthetic resin is injected into the cavity 5' through pinpoint gate 4d, so that there is obtained a composite P' in which the whole area of the lower portion 6a' of a synthetic resin mold 6' is strongly coupled with the whole area of the surface of the anodic oxidation coating 2 in its intruded condition.

Further, it is of course that another composite may be produced by such a process that, though not shown, a metal mold formed therein with plural number of cavities in a desired shape is used as a female mold, and a metal mold formed therein with plural number of sprues for individually connected to the respective cavities is used as a male mold, and molten synthetic resin is injected through the respective sprues into the respective cavities, so that there is obtained a composite in which plural number of mutually independent synthetic resin moldings are coupled in their intruded condition with the surface of the anodic oxidation coating of the anodic oxidization treated plate.

Furthermore, in the case of the anodic oxidization treated plate A' formed on its both sides with the anodic oxidation coatings 2 and 2, as mentioned above, a composite in which the synthetic resin molding is coupled with both the coating surfaces may be produced.

Furthermore, it has been recognized in general that when a bond strength, that is, a tensile strength using a tensile tester is measured on the composite produced by coupling the synthetic resin mold with the anodic oxidation coating using the phosphoric acid bath, and the composite produced by coupling the synthetic resin mold with the anodic oxidation coating using the sodium hydroxide bath, the composite produced using the anodic oxidization treated plate formed using the phosphoric acid bath is larger in tensile strength than the composite produced using the anodic oxidization treated plate formed using the sodium hydroxide bath. Furthermore, it has been confirmed that the anodic oxidization treated plate with the sodium hydroxide bath has the tensile strength of at least 20 Kgf, and the anodic oxidization treated plate with the phosphoric acid plate has the tensile strength of at least 30 Kgf.

3) After-Treatment:

The composite P in which the synthetic resin mold 6 is coupled with the portion of the anodic oxidation coating 2 as shown in FIG. 2 may be a product as it is. However, the respective anodic oxidation coatings 2 formed using the phosphoric acid bath and the sodium hydroxide bath are comparatively weak in an electrical insulation and an anti-corrosion properties, and therefore it is preferable that an after-treatment is applied to the portion of the surface of the anodic oxidation coating that is not overlapped with the synthetic resin molding and is exposed to the air. As an after-treatment, it is preferable that a paint coating process or a process for forming an anodic oxidation coating formed using a sulfuric acid bath is carried out, and, as desired, a sealing treatment on the sulfuric acid coating is carried out, and, if needed, a coloring treatment for putting in a desired color is applied thereto for obtaining a product that is excellent in electric insulation property and anticorrosion property, and beautiful in appearance.

Figure 6:
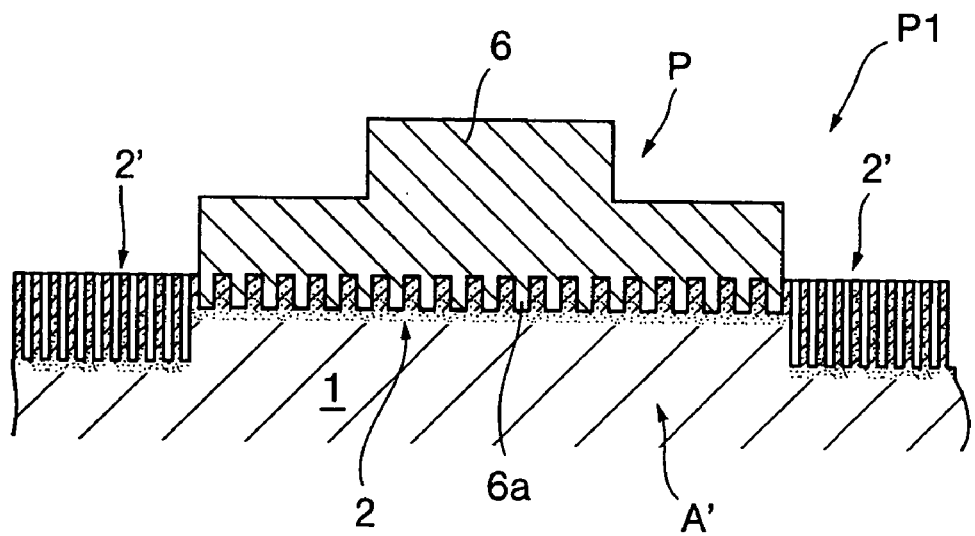
FIG. 6 is a schematic section of a portion of a composite of the present invention in which the remaining portion of the anodic oxidation coating that is not overlapped with the synthetic resin molding of the composite of the present invention as shown in FIG. 5 is applied with a sulfuric acid anodic oxidation coating by an after-treatment.

FIG. 6 shows a composite P1 which is one example obtained by such an after-treatment that after the composite P as shown in FIG. 5 is produced, such an anodic oxidation coating area that is around the synthetic resin molding 6 and is not overlapped with the same and is exposed to the air is formed with an anodic oxidation coating 2' by the sulfuric acid. Further, if necessary, a well known sealing treatment is applied to the coating 2'. The sulfuric acid anodic oxidation coating 2' is in general that the pores made open in the surface thereof is as small as 10 nm in diameter and 2-10μ in depth, and therefore, a composite P' that is excellent in electric insulation and anti-corrosion properties is provided. In order to provide the said coatings 2', the composite P as shown in FIG. 5 is subjected to cleaning or degreasing, neutralizing and chemical polishing, and thereafter it is anodized in a sulfuric acid bath comprising, for instance, 10-20% aqueous solutions of sulfuric acid, at temperature in the range of 15-25° C. and a direct current electrolysis is performed at a voltage of 10-25 V, at a current density of 1-2/Adm$^2$. Thereafter, it is subjected to a sealing treatment by any well known means such as a steaming treatment or boiling treatment, or the like. For coloring, before the sealing treatment, it is colored by a well known coloring means, using, for instance, a dye bath at a temperature of 50-70° C. using any dye selected from various kinds of dyes such as acid dyes, mordant dyes, basic dyes or the like.

In the course of that the composite is subjected to the various steps of the above-mentioned after-treatment process, the temperature difference at the respective treatment steps is so large that is 100° C. at the maximum and 15° C. at the minimum. Therefore, at every time during the course of the each step of after-treatment, the composite is repeatedly given the heat shock caused by the rapid temperature difference. Accordingly, taking the difference in linear expansion between aluminum and synthetic resin into consideration, it is preferable, for synthetic resin materials to be injected for forming synthetic resin moldings by the injection molding, to selectively use such synthetic resin that has an elastic modulus which is able to absorb the linear expansion between them, preferably, that of 10000 Mpa or below and that has a water resisting property and a chemical resisting property. For such synthetic resins, Polybutylene terephthalate (PBT), polyethylene (PE), polypropylene (PP) and the like are optimum.

Figure 7:
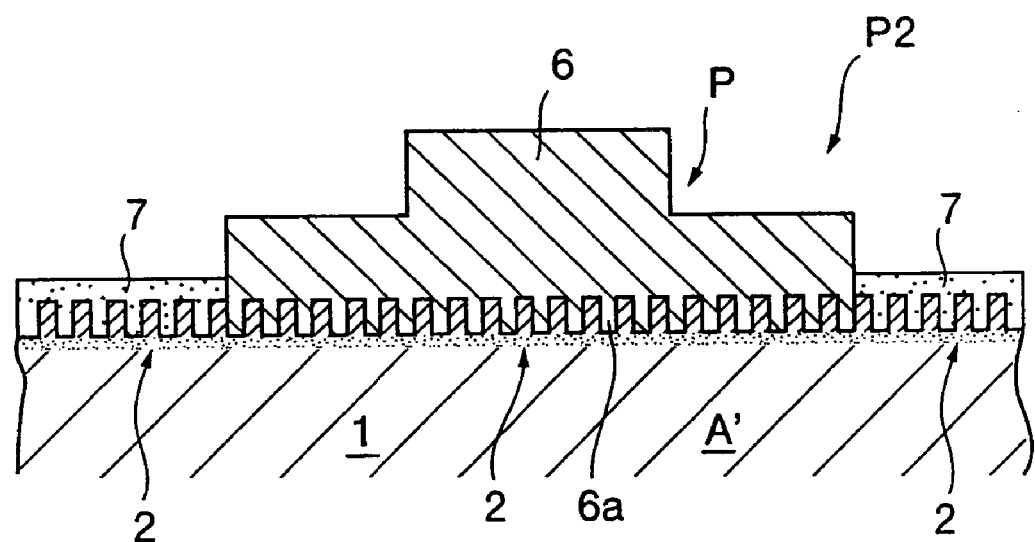
FIG. 7 is a schematic vertical section of a portion of a composite of the present invention in which the remaining part of the anodic oxidation coating that is not overlapped with the synthetic resin molding of the composite of the present invention as shown in FIG. 5 is applied with a paint-coating by an after-treatment.
Figure 8:
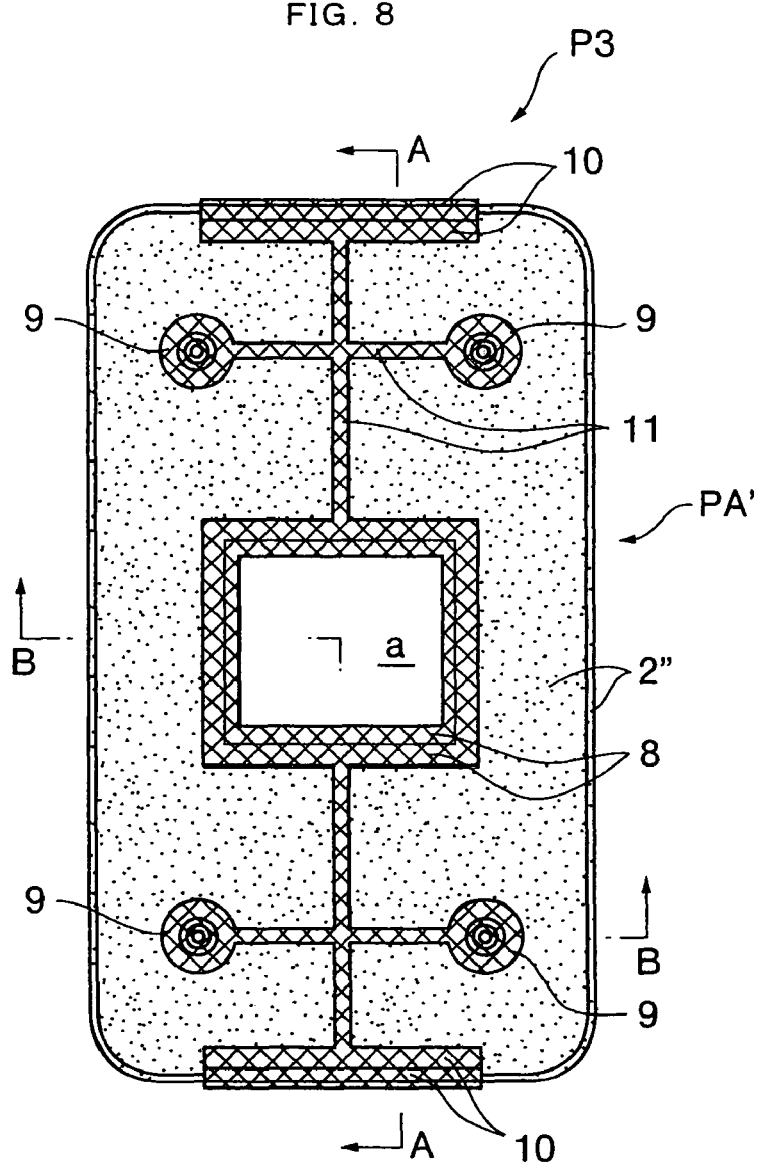
FIG. 8 is a rear view of one embodiment composite for using as a cover or container for a switch box that is produced according to a process for producing a composite according to the present invention.
Figure 9:
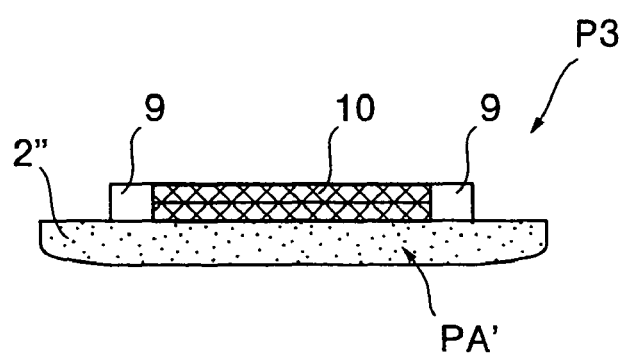
FIG. 9 is a side view of the composite as mentioned above.

FIG. 7 shows a composite P2 produced by such an after-treatment that the area portion of the anodic oxidation coating 2 that is not overlapped with the synthetic resin mold 6 and thus is exposed to the air is applied with a paint coating 7. In the case of paint coating, since the anodic oxidation coating 2 formed by the phosphoric acid bath or the sodium hydroxide bath has the innumerable pores 3, part of the paint coating is invaded into these pores 3 and after dried at a normal temperature or by heating, it is obtained as a stable and fast paint coating 7 strongly adhered to the coating 2. Accordingly, it is unnecessary to apply a primer treatment to the anodic oxidation coating before the paint coating treatment. The thickness of the paint coating 7 is about 10 microns, but is not limited thereto.

As for paint coating materials, various kinds of synthetic resin coatings such as vinyl resin, acrylic resin, phenol resin, silicone resin, urethane resin, etc are preferably used in general.

As is clear from the above, when the process for producing a composite according to the present invention is used, in stead of production of the composites produced by integrally assembling the previously prepared aluminum raw materials in the shape of plate or a press-worked one formed in any desired various shape and the previously prepared synthetic resin moldings formed in any desired shape through various kinds of interconnecting tools by the conventional producing process, the composites corresponding to the conventional composites can be produced at a higher efficiency and economically through a less number of steps for production. The process for producing the composite according to the present invention is applicable to producing composites such as a container or cover for a switch box, containers or covers for digital cameras, chassis for mounting electric parts or electronic parts, interior or exterior apparatus such as front panels, door handles, number plates of automobiles, etc, various kinds of building materials, various kinds of indoor or outdoor ornamental articles, etc.

FIGS. 8 to 11 show a composite P3 of the present invention corresponding to the conventional box cover as shown in FIG. 20. The composite P3 was produced according to the process for producing the composite of the present invention as mentioned above as follows.

Namely, an aluminum raw material work shaped into a cover casing and provided with at its center a square hole a for passing distributing wires, by press-working of an aluminum raw material plate was treated with a phosphoric acid bath and under the same condition as the Example 1, so that a cover-type aluminum material PA' provided with an anodic oxidation coating 2 comprising innumerable surface-open pores of which most are 40 nm in diameter, in other words, an anodic oxidization treated cover PA' was made, and thereafter it was set in a metal mold for injection molding, and molten polyethylene resin was injected, so that there was produced such a composite for a switch cover P3 that comprises a tubular molding 8 around the square hole a, four cylindrical moldings 9 positioned in the vicinity of the four corners of the cover PA' to be used as studs for mounting a chassis for installing electric and electronic equipments, and engaging moldings 10 formed to extend from the rear surfaces of the middle portions of the upper and lower side walls of the cover PA' to the ends of the upper and lower side walls for engaging with a case for a switch cover, with the above-mentioned respective moldings are coupled with the innumerable the pores in their intruded condition. Symbol 11 denotes ribs formed in conformity with runners connecting to respective cavities for forming the moldings 8-10 from a single gate made at the center of the injection molding metal mold. These ribs are useful for supporting the cover PA' from behind and reinforcing a mechanical strength thereof. Further, the whole area of the portion of the cover PA' that is not covered with these moldings is formed with an anodic oxidation coating 2"by the after-treatment using sulfuric acid bath.

Thus, as is clear from the composite of the present invention as shown in FIG. 8-FIG. 11, it has been recognized that after the aluminum material worked into a desired shape, in other words, an aluminum work, is formed with the anodic oxidation coating according to the present invention on the surface of the worked aluminum raw material, part of the synthetic resin molding having any desired shape and size is coupled in its intruded condition with at least one side surface of both the anodic oxidation coatings of the worked aluminum material by means of the injection molding process, so that a composite of the aluminum material and the synthetic resin molding strongly coupled together can be obtained at a stroke.

In order to measure a tensile strength of the synthetic resin moldings 8-10 on the anodic oxidization treated aluminum cover PA' that is the composite P3 as illustrated, the composite was fixed in position, an inserting rod of a tensile tester was screwed into the cylindrical stud (10 nm in the outer diameter), and from this state, the tensile tester was pulled upwardly and when the graduations of the tensile tester was observed, even an indicator needle was moved beyond 50 Kgf indicating the threshold value of the indicated graduations, the moldings 8-10 was steady and thus a large peel strength thereof was demonstrated. When the same tensile strength test as mentioned above was carried out on a composite using the anodic oxidization treated aluminum material formed in Example 2, the crack was generated between the interfacial joint portions at the tensile strength of 45 Kgf, but a large peel strength was demonstrated.

According to the present invention as mentioned above, a further advantageous effect is brought about as follows. Namely, heretofore, it has been carried out that an aluminum plate was press-worked into a casing and metallic studs for installing electrical parts are electrically welded to the rear surface of the casing. However, in the case where the thickness of the aluminum plate is 0.6 mm or less, it is distorted by the electric welding, and it is difficult that it is merchandised as goods without distortion. Whereas, according to the present invention, the aluminum casing is formed with the anodic oxidation coating comprising the pores being 25 nm or more in diameter as mentioned above, and the studs of synthetic resin molds can be coupled with the rear surface of the aluminum casing by injection molding process, so that a composite without distortion is produced and it is possible that it is merchandised.

Figure 12:
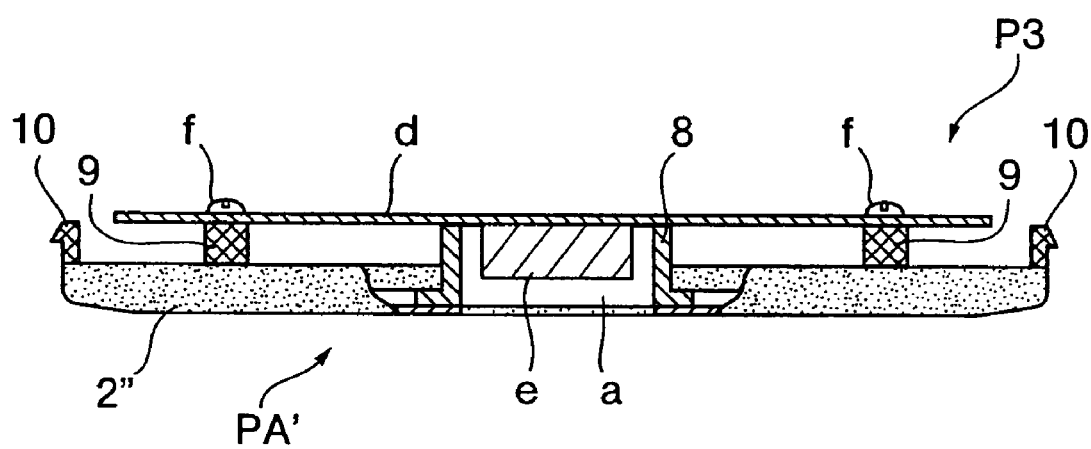
FIG. 12 is a sectional view, partly omitted, of such a state of use of the composite of the present invention as shown in FIG. 8, that a chassis for electronic apparatus is fixed thereto.

FIG. 12 shows such a state of use that a chassis is attached to the foregoing composite PA. Namely, it shows that the chassis d provided with electronic equipments is placed on the studs 9 positioned at the four corners thereof, and each screw f is screwed into the stud 9 to fasten the chassis d to these studs 9,9, . . . .

Figure 13:
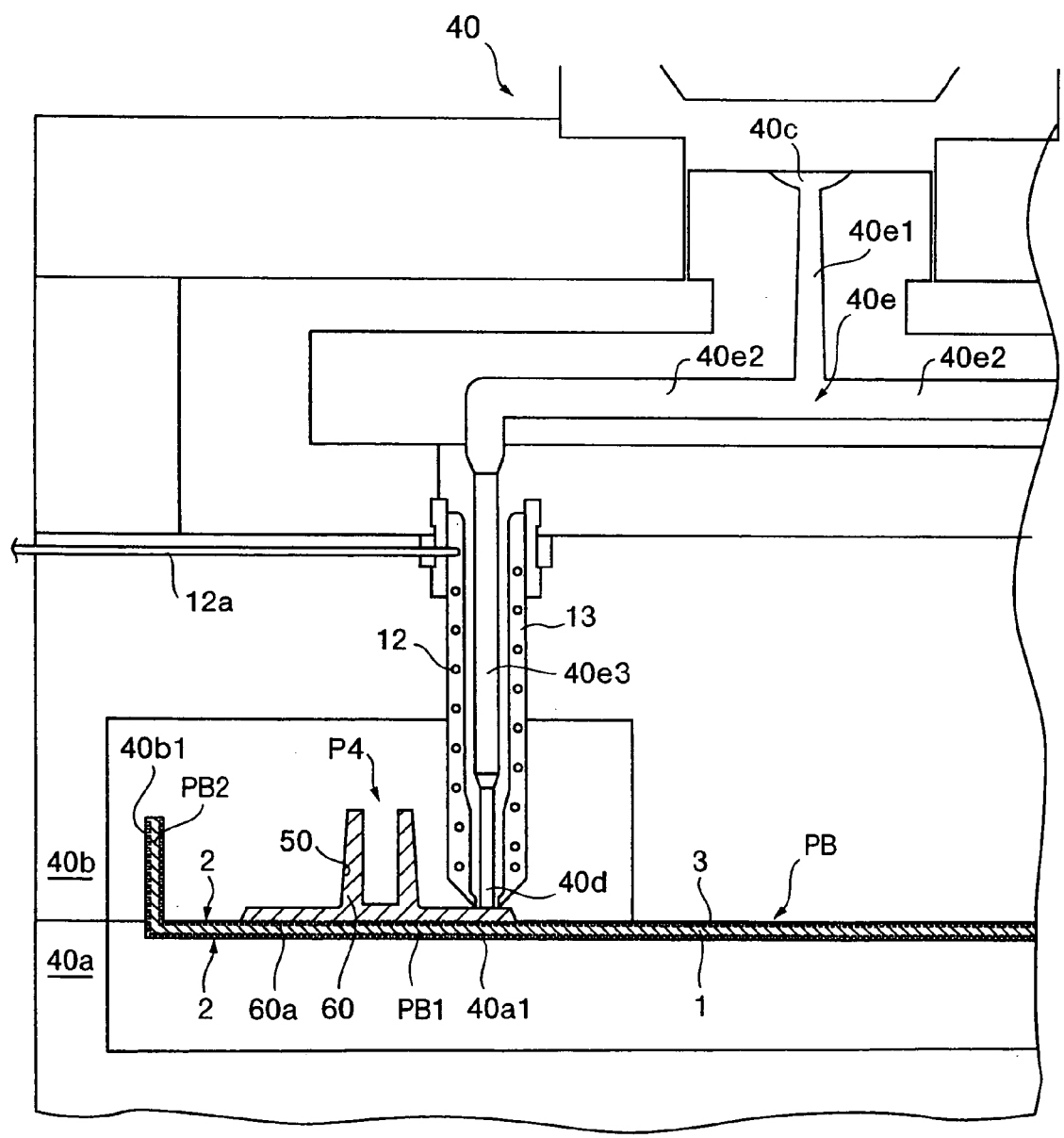
FIG. 13 is sectional side view of an important portion of part of a molding device for injection molding used as further another embodiment of a process for producing a composite according to the present invention.

In producing the composite of the present invention by the metal mold for injection-molding, it is preferable to produce it using a hot runner mold. FIG. 13 shows one example of the hot runner mold. In the drawing, symbol 40 denotes the mold. The mold 40 comprises an upper mold 40b and a lower mold 40a. The upper mold 40b is provided with a sprue 40c at the center of the upper surface thereof and a right gate 40d and a let gate 40d on the right and left sides of the bottom surface thereof that are positioned at the equal distances apart from the sprue 40c. A runner 40e for connecting between the sprue 40c and each of the gates 40d on the right and left, is formed as follows. Namely, The runner 40e is formed to be composed of a central passage 40e1 extending downwardly from the sprue 40e, a horizontal passages 40e2 and 40e2 extending right and left from the central passage 40e1, and vertically downward right and left passages 40e3 and 40e3 extending downwardly from the right and left horizontal passages 40e2 and 40e2 and connecting to the right and left gates 40d and 40d. In addition, a nozzle 13 containing a heater 12 therein is provided so as to surround the each vertically downward passage 40e3 and the each gate 40d on either side of the runner 40e, and thus the runner 40e is formed into a hot runner.

Regarding the heater 12, either of a heating coil of an electric heater connecting to an outside power source and an electromagnetic induction heating coil connecting to an outside high-frequency oscillator may be acceptable. In the drawing, 12a denotes a leading wire connecting to an outside high-frequency oscillator.

In addition, in the bottom surface of the upper mold 40b, there is made a cavity 50 connecting to each gate 40d on the right and left sides thereof. In one example as shown in the drawing, the cavity 50 shows the one for forming a stud. On the other hand, in the upper surface of the lower mold 40a, there is made a square mounting recess 40a1 for mounting in place a bottom wall portion of a tray-shaped aluminum material PB formed with an anodic oxidation coatings 2 and 2 having an innumerable pores 3 formed on both side surfaces of a case-shaped aluminum raw material according to the present invention, and further, in the bottom surface of the upper mold 40b, there is made a square groove 40b1 for fitly inserting a square side wall PB2 upwardly protruding from the four sides of the bottom wall PB1 of the tray-shaped aluminum material PB. Since the mold 40 is symmetrical, the illustration of the left-half important constructional portion thereof is omitted in the Figure.

Thus, the upper mold 40b and the lower mold 40a are closed each other as illustrated, and the outside high-frequency oscillator is driven to supply the electric power to the heating coil 12, so that the aluminum work PB is heated by an electromagnetic induction action, and, in the meantime, molten synthetic resin is injected into each cavity 50 from each gate 40d on either side through the sprue 40c and the runner 40e by a heating cylinder of an injection molding device so as to form a synthetic resin molding 60 in the form of the stud. In this molding process, the molten synthetic resin passing through the runner 40e, before entering the cavity 50, is heated by the heating coil 12 built in the nozzle 13 on either side, and thereby a good fluidity thereof is kept, so that the molten synthetic resin can be easily filled in the cavity 50 up to the corners thereof, and at the same time can be easily invaded into the innumerable pores on the opposite side of the cavity. Consequently, when the power supply is cut off, so that there is produced a fast composite P4 in which the lower portion 60a of the synthetic resin molding of the stud 60 obtained as a result of solidification thereof by a cooling action of the lower mold 40a is fully intruded in the pores. Further, the heating coil 12 is preferably made of copper, and as desired, a pipe heating coil may be used for passing cooling water and preventing generation of heat.

Production of the composite of the present invention using the plate-shaped aluminum raw material as a raw material includes also a case of production of composite printed on the surface thereof. For producing such a composite, it can be produced by the following three different producing processes. This will be explained with reference to FIGS. 14-16.

Figure 14:
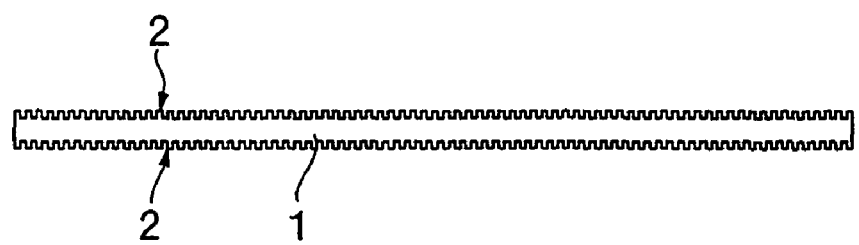
Figure 14:
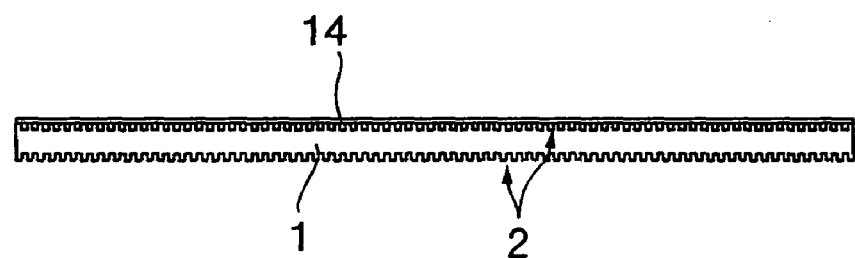
Figure 14:
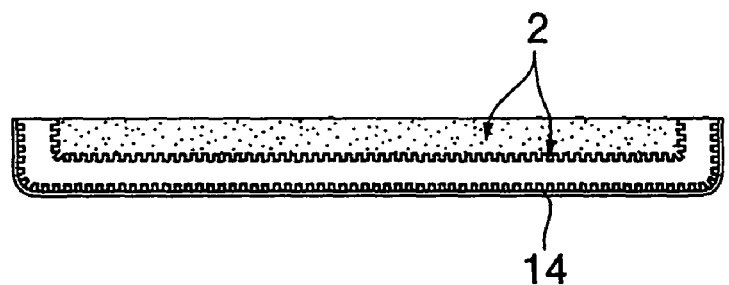
Figure 14:
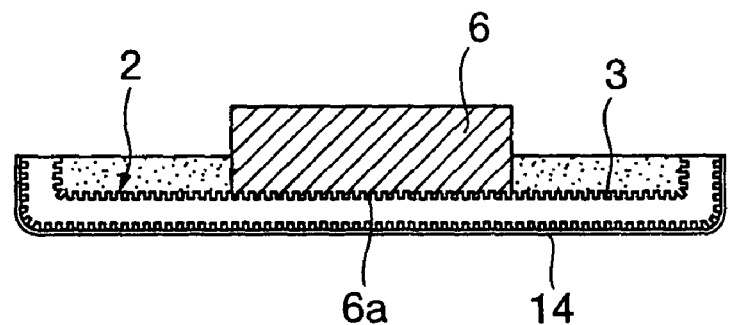

Producing Process 1:

A composite is produced by the processing steps (a), (b), (c) and (d) as shown in FIG. 14. Namely, at the first step, forming both the surfaces of the plate-shaped aluminum raw material 1 with an anodic oxidation coatings 2 and 2 as shown in the same Figure(a), then printing one side surface of both the anodic oxidation coatings 2 and 2 thereof in a desired ink by a desired printing means to form a printed surface as shown in the same Figure(b), then bending the same in second dimensions or third dimensions, for instance, bending at the four sides thereof as illustrated, to be formed into a tray-shaped one, by press working as shown in the same Figure(c), and then strongly coupling a desired shaped synthetic resin molding 6 with the anodic oxidation coating 2 on the opposite side to the printed surface in such a condition that a portion 6a thereof is intruded in the pores 3 thereof, by the injection molding to produce a composite, as shown in the same Figure (d).

Figure 15:
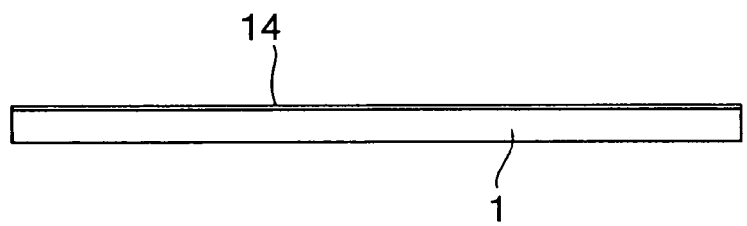
Figure 15:
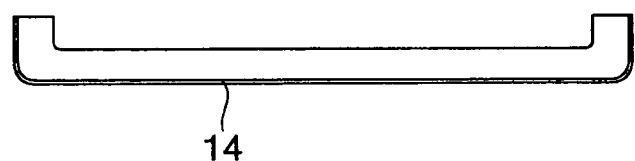
Figure 15:
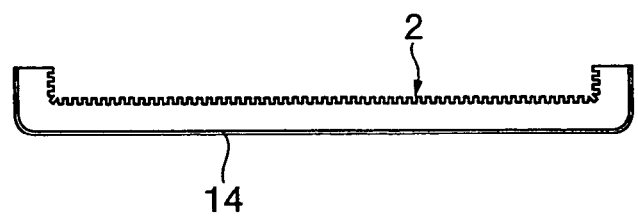
Figure 15:
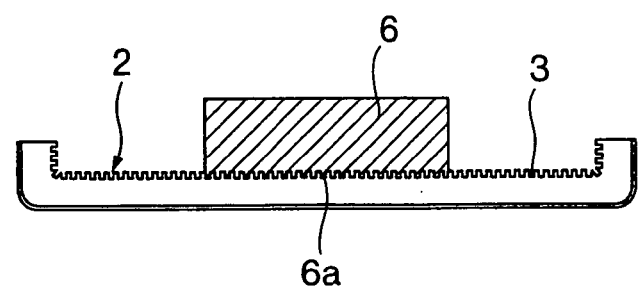

Producing Process 2:

A composite is produced by the processing steps (a), (b), (c) and (d) as shown in FIG. 15. Namely, at the first step, forming a printed surface 14 on one side surface of a plate-shaped aluminum raw material 1 as shown in the same Figure (a), then bending the same in two dimensions or three dimensions, for instance, bending the opposite both sides thereof into a U-shaped frame, by press working as shown in the same Figure(b), then forming an anodic oxidation coating 2 of the present invention on the other surface of the aluminum raw material as shown in the same Figure(c), and then strongly coupling a desired shaped synthetic resin molding 6 with the anodic oxidation coating 2 in such a condition that a portion 6a thereof is intruded in the pores 3 thereof, by the injection molding to produce a composite, as shown in the same Figure (d).

Figure 16:
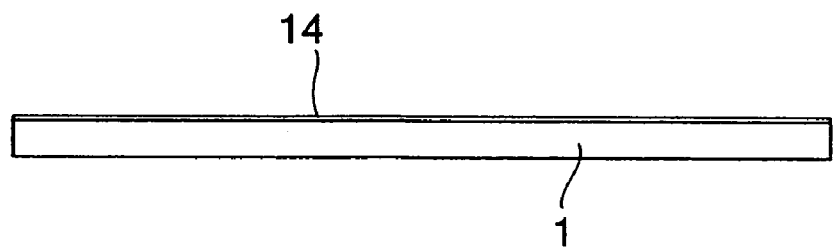
Figure 16:
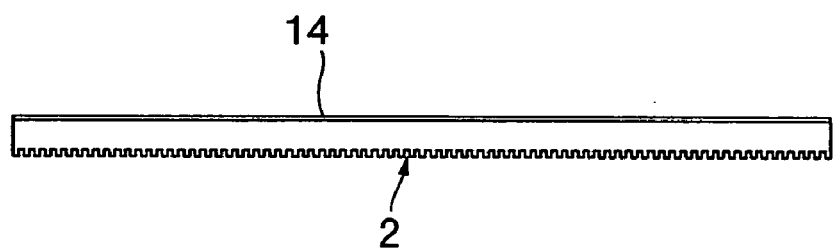
Figure 16:
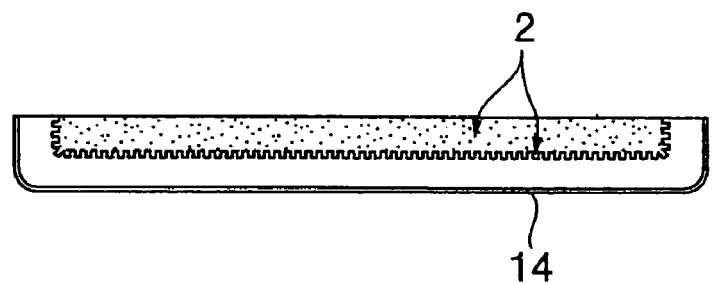
Figure 16:
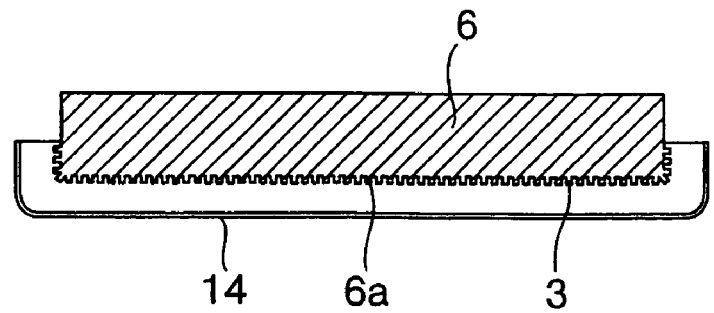

Producing Process 3:

A composite is produced by the processing steps (a), (b), (c) and (d) as shown in FIG. 16. Namely, at the first step, forming a printed surface 14 one side surface of a plate-shaped aluminum raw material 1 as shown in the same Figure (a), then forming an anodic oxidation coating 2 of the present invention on the other side surface thereof as shown in the same Figure(b), then forming it in two dimensions or three dimensions, for instance, bending at the four sides thereof as illustrated to be formed into a tray-shaped one, by press working, as shown in the same Figure(c), and then strongly coupling a desired shaped synthetic resin molding 6 with the anodic oxidation coating 2 in such a condition that a portion 6a thereof is intruded in the pores 3 thereof, by the injection molding to produce a composite, as shown in the same Figure (d).

Inks for using the printing and the printing means are selectively adopted from well known ones, and there are various kinds of inks prepared by dispersing pigments in vehicles such as synthetic resins, oils, solvents, etc and adding thereto auxiliary materials such as waxes, driers, etc., and as kinds of printing inks, there are relief-printing inks, planographic printing inks, rotogravure inks, ultraviolet radiation hardening type inks, and the like, and the respective printing inks suitable for respective types of printers are selectively used, and printing using these printing inks is applied to one side surface of an aluminum plate or the anodic oxidation coated surface of an anodic oxidization treated aluminum plate by means of a roll-coater printing, an offset printing, a flow-coater printing, etc, to form a printed face thereon. A thickness of the printed coat is generally obtained in the range of about 5-30μ.

As is easily understood from the above-mentioned process for producing a composite, a composite comprising a cast mold that part of an aluminum raw material formed with an anodic oxidation coating on the surface thereof is embedded strongly in the inside of a desired shaped synthetic resin molding can be produced by an insert molding, besides the above-mentioned injection molding. Namely, though not illustrated, the above-mentioned aluminum material formed with the anodic oxidation coating is inserted into a cavity of a mold for insert molding, and, in this state, molten synthetic resin is injected into the cavity to be filled in the cavity under pressure, so that there can be produced a composite in which the part of the aluminum member is embedded, in coupled and intruded condition, in a synthetic resin molding and which is large in tensile strength and stable and fast against impact and vibrations.

FIG. 17 shows one example of the composite produced by the above-mentioned insert molding.

A composite P5 as shown in the same Figure has such a construction that a U-shaped frame member formed by bending a thick and long rectangular plate 10 into a U-shape in the transversal direction by press working is anodized to have an anodic oxidation coating 2 of the present invention on the whole surface thereof, and parts of upper and lower arm portions PC1 and PC1 of the anodic oxidization treated member PC are cast in a thick and long rectangular synthetic resin mold 600 in a mutually coupled state, for serving as a handle. As is clear in the same Figure, a portion 600a of the molding 600 is jointed to the surfaces of the arms PC1 and PC1 in the intruded condition, so that a composite that is stable and fast against impact and vibrations can be obtained.

The above-mentioned processes are intended to produce a composite at a stroke by the injection molding. However, A composite of the present invention may be produced by such a process that a desired shaped synthetic resin molding and an anodic oxidization treated aluminum material in a shape of plate or a press-worked one in other desired shape are manufactured separately in advance and both the members are subjected to a heating and pressing means.

FIG. 18 shows one example of an apparatus carrying out a process for producing a composite using a heating and pressing means. In the same Figure, Reference numeral 15 denotes a heating and pressing apparatus. The apparatus 15 comprises an electromagnetic induction heating device 15A and a press head 15B which is moveable up and down by a pressure piston (not shown). The electromagnetic induction heating device 15A is provided with a flat-faced heating coil 12' connecting to an outside high-frequency oscillator 17 and built in a bottom wall 16a of a tray-shaped jig 16, and a recess portion 16c formed by surrounding the bottom wall 16a and a square peripheral wall 16b of the jig 16 is so constructed as to be acceptable an anodic oxidization treated aluminum material. The aluminum material PD as illustrated is previously prepared by such a working that the aluminum raw material 1 formed into a tray-shaped one by press working and one side surface thereof is then formed with a printed surface 14 and the other surface thereof is then formed with an anodic oxidation coating 2. In the Figure, reference numeral 18 denotes a jig setting plate placed on the working bench 19.

Figure 10:
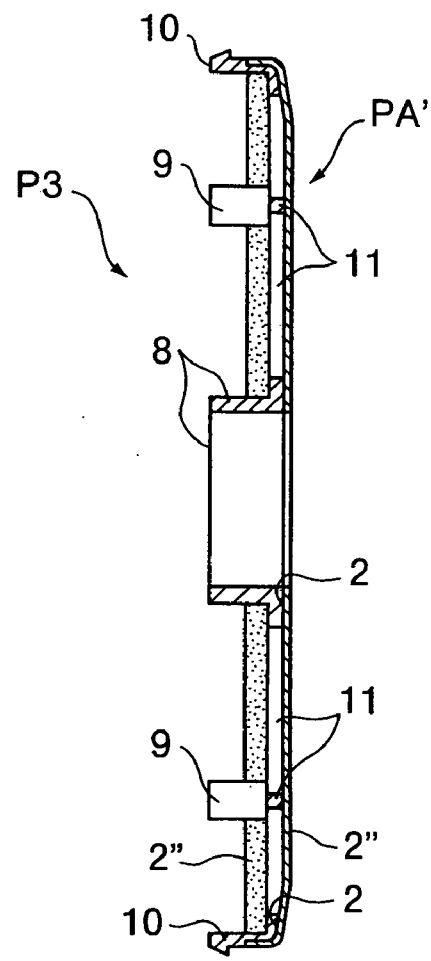
FIG. 10 is a sectional view taken along the line A-A in FIG. 8.
Figure 11:
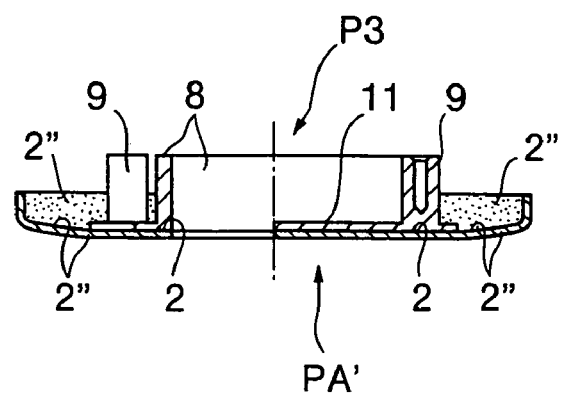
FIG. 11 is a sectional view taken along the line B-B in FIG. 8.

For producing a composite using the apparatus 15, the tray-shaped aluminum material PD is so placed on the bottom surface of the recess portion 16c of the jig 16 that the rear surface having the anodic oxidation coating 2 thereof may be directed outwardly and a synthetic resin molding previously formed into a desired shape, as shown in the illustrated example, for example, plural number of synthetic resin moldings 60' each in the shape of a stud whose shape is the same as the mold 60 as shown in FIG. 10 are placed at their predetermined positions on the horizontal bottom area and of the anodic oxidation coating 2, and in this state, the press head 15B is moved downwardly to press and these molds 60' from above against the surface of the anodic oxidation coating 2, and under the pressure the high-frequency oscillator 17 is actuated and the electric current is supplied to the heating coil 12', so that the aluminum material PE is heated by the induction heating thereof, and the part of each stud molding 60' that is brought in contact under pressure with the surface anodic oxidation coating 2 is molten, and the molten resin is invaded into the innumerable number of the pores 3. After a while, the electric the molten synthetic resin is cooled to be solidified, so that the part of the synthetic resin mold 60' is coupled with the anodic oxidation coating 2 in the condition that the it is intruded in the innumerable pores 3, so that there is obtained a composite P6 in which the synthetic resin mold 60' and the aluminum material PD are bonded together strongly.

When a further more specific embodiment of the process for production of the above-mentioned composite will be explained, the synthetic resin molding 60' is a tubular molding having a diameter of 6 mm made by injecting synthetic resin, polyacetal (POM), the printed coat 14 applied to the surface of the aluminum raw material is made by printing in ink composed mainly of alkyd resin paint and then baking. When the electric power is supplied to the heating coil 12' at a current density of 7 A/dm$^2$, only for 1-12 seconds, the aluminum material PD is heated to 180-190° C., so that the molding 60' made of POM which is low in melting temperature is molten in a moment, and is invaded into the innumerable pores 3 of the anodic oxidation coating, and is solidified immediately after cutting-off of the electric power supply. Thus, the composite can be obtained for a short time and at a high efficiency.

Further, as the printed coat 14 is made of alkyd resin coating material, it is not damaged by the temperature range of the above. Furthermore, in stead of the printed coat 14 using printing inks, it is possible to use various kinds of synthetic resin paints not containing pigments and form the corrosion resisting coat as shown in FIG. 7. In either case, it is necessary that the surface of the aluminum raw material or the surface of the anodic oxidation coating formed by anodic oxidization treatment, the same is coated with the heat resistant coating paint or printing ink that can withstand the temperatures for melting synthetic resin moldings.

The high-frequency oscillator 17 is variable to be in the range of 500 W-50 Kw in output and 50 KHz-3 MHz in frequency. In the above-mentioned one embodiment of the heating and pressure means, it has been found suitable that that the output thereof is 2.5 Kw and the frequency is 900 KHz.

FIG. 19 shows a composite P7 comprising a laminated pipe. The process for producing the same is carried out as follows. The anodic oxidization treatment according to the present invention is applied to a thick and pipe-shaped aluminum raw material 100 formed by an extruder, so that an anodic oxidation coating 2 according to the present invention may be formed over the inner and outer circumferences and a total length thereof to make a tubular aluminum material PE. Next, the tubular aluminum material PE is passed through a co-extruding molding machine, and molten synthetic resin is applied under pressure to the total length and circumferential surface of the anodic oxidation coating 2 formed on the outer surface of the aluminum material, so that a synthetic resin mold that is formed into a tube having a desired thickness and in such a condition that part thereof is invaded into the innumerable pores 3 of the coating 2 is extruded together with the tubular aluminum material, and thus the composite P7 in the shape of the laminated pipe P7 is produced. As illustrated, there is obtained the composite P7 composed of the mutually layered tubes strongly bonding together in such a constructional state that part 6000a of the tubular synthetic resin mold 6000 laid in an outer layer is intruded in the innumerable pores 3 of the anodic oxidation coating 2 formed on the outer surface of the tubular aluminum material PE laid as an inner layer.

As is understood from the above, the aluminum raw material is limited to a straight plate one or a bent work thereof, and may be a tubular one as mentioned above, or, though not shown, any desired shaped one such as a circular or prismatic solid column, etc. The surface of any selected one thereof is formed with the anodic oxidation coating according to the present invention to make the anodic oxidization treated one, and the synthetic resin mold in a desired form is coupled with the anodic oxidation coating of the aluminum material in the above-mentioned intruded condition, so that a composite strongly bonding the two members together can be produced.

INDSTRIAL APPLICABILITY

As is clear from the above, the present invention is applicable to all of the industrial fields for producing a composite of an aluminum material and a synthetic resin mold such as buildings, boats and ships, aircraft, railroad rolling stock, etc, interior and exterior panels such as interior door grips, exterior emblems, etc of automobiles, various casing or boxes and internal functional parts of personal computers, digital cameras, pocket telephones, PDA, electronic books, printers, televisions, audio devices, building materials, and others.

What is claimed is:

1. A composite of a worked aluminum material and a synthetic resin molding, selected from the group consisting of polybutylene terephthalate (PBT), polyethylene (PE), polypropylene (PP), ABS and PPS and polyacetal (POM), so constructed that the synthetic resin molding is coupled with an anodic oxidation coating comprising innumerable pores having a diameter of from between 25 nm to about 90 nm and a depth from between about 1 μm to about 1.5 μm on the surface of the worked aluminum material, such that the synthetic resin molding is intruded in the innumerable pores thereof and bonded together over a part or the whole surfaces thereof as to have a vertical tensile strength from between 20 Kgf/cm^2 to 45 Kgf/cm^2.

2. The composite of claim 1 produced by a process comprising:
    (a) soaking an aluminum raw material in an electrolytic bath of phosphoric acid or sodium hydroxide, the surface(s) thereof are subjected to an anodic oxidization treatment by direct current electrolysis to form an anodic oxidation coating comprising innumerable pores having a diameter of from between 25 nm to about 90 nm, and a depth from between about 1 μm to about 1.5 μm; and
    (b) placing at least a portion of the worked aluminum material with the anodic oxidation coating in a cavity in a predetermined shape in a metal mold, and injecting molten synthetic resin toward the exposed surface of the anodic oxidation coating so that the molten synthetic resin, selected from the group consisting of PBT, PE, PP ABS, PPS and POM, may be invaded into the innumerable pores and also may be filled in the cavity under pressure to be molded, so that a vertical tensile strength of the synthetic resin a vertical tensile strength from between 20 Kgf/cm^2 to 45 Kgf/cm^2.

3. A composite produced by applying an after-treatment process wherein after the composite is produced by the process of claim 2, the synthetic resin mold is so coupled with the anodic oxidation coating of the desired shaped aluminum material that part thereof is intruded in the innumerable pores, the remaining part of the anodic oxidation coating that is not overlapped with the synthetic resin molding is applied with paint so that a corrosion resistant paint coating is formed thereon.

4. A composite produced by a process for producing a composite wherein a phosphoric acid or sodium hydroxide anodic treated anodic oxidation coating formed on at least one surface of a worked aluminum material in a shape of a plate or bent into two dimensions or three dimensions by press working, is placed in a jig containing a heating apparatus in such a manner that the anodic oxidation coating may be directed upwards, and a synthetic resin molding, selected from the group consisting of polybutylene terephthalate (PBT), polyethylene (PE), polypropylene (PP), ABS, PPS and polyacetal (POM), in a desired shape is placed on the anodic oxidation coating and is pressed from above, and a contact portion of the synthetic resin mold with the anodic oxidation coating surface is molten by the heating apparatus under a condition that it is being contacted with the surface of the anodic oxidation coating under pressure, so that the molten resin is invaded into the innumerable pores having a diameter of from between 25 nm to about 90 nm and a depth from between about 1 μm to about 1.5 μ, and in this state, an a vertical tensile strength from between 20 Kgf/cm^2 to 45 Kgf/cm^2.

5. A composite produced by a process comprising the steps:
    (a) forming an aluminum raw material into a tubular one by an extruder,
    (b) applying an anodizing treatment to the tubular aluminum raw material to form an anodic oxidation coating with innumerable pores having a diameter from between about 25 nm to about 90 nm and a depth from between about 1 μm to at least 1.5 μm made on the surface thereof may be formed, and
    (c) jointing a tubular-formed synthetic resin molding, selected from the group consisting of polybutylene terephthalate (PBT), polyethylene (PE), polypropylene (PP), ABS, PPS and polyacetal (POM), having a desired thickness under pressure with the circumferential surface and along the length direction of the anodic oxidation coating of the tubular aluminum material by a co-extruding molding machine, so that a composite in which the tubular aluminum material a vertical tensile strength from between 20 Kgf/cm^2 to 45 Kgf/cm^2.

6. The composite of claim 2, wherein the electrolytic bath is phosphoric acid or sodium hydroxide bath.

7. The composite of claim 2, wherein the aluminum raw material is anodized in the phosphoric acid bath comprising 15-40% aqueous solutions of phosphoric acid in concentration and having a bath temperature in the range of 10-30° C. and a direct current electrolysis is carried out for 5-25 minutes, at a voltage of 20-100V, at a current density of 0.5-2 A/dm², so that the anodic oxidation coating having the innumerable pores having a diameter of between about 30 nm to about 90 nm and a depth from between about 1 μm to about 1.5 μm is formed.

8. The composite of claim 2, wherein the aluminum raw material is anodized in a bath comprising 0.05-0.3 mol aqueous solutions of sodium hydroxide, and having a bath temperature in the range of 10-30° C., and a direct current electrolysis is carried out for 5-25 minutes, at a voltage of 15-45V, at a current density of 0.5-3 A/dm², so that the anodic oxidation coating having the innumerable pores having a diameter of between 25 nm to about 90 nm and a depth from between about 1 μm to about 1.5 μm is formed.

9. The composite of claim 2, wherein the molten synthetic resin is injected into the cavity of the metal mold under a heated condition of the metal mold.

10. The composite of claim 2, wherein the aluminum raw material in the shape of a plate or a worked aluminum raw material bent into two or three dimensions by press working is used, and the synthetic resin mold is coupled with the partial or whole surface of the anodic oxidation coating thereof by injection molding.

11. The composite of claim 2, wherein a portion of a desired-shaped aluminum material formed with the anodic oxidation coating formed by the phosphoric acid or sodium hydroxide bath is inserted into a cavity of a metal mold for insertion molding, and in this condition, molten synthetic resin is injected into the cavity and part of the molten synthetic resin is invaded into the innumerable pores of the anodic oxidation coating and bonded together over a part or the whole surfaces thereof, and in this state is filled in the cavity under pressure to be molded.

12. The composite of claim 2 produced by a process comprising:
    coupling the synthetic resin mold with the anodic oxidation coating of the desired shaped aluminum material so that part thereof is intruded in the innumerable pores, the remaining part of the anodic oxidation coating that is not overlapped with the synthetic resin molding is cleaned and is then subjected to an electrolysis using a sulfuric acid bath, so that a corrosion resistant coating of alumite is formed.

13. A composite of claim 2 produced by the process comprising:
    coupling the synthetic resin mold with the anodic oxidation coating of the desired shaped aluminum material that part thereof is intruded in the innumerable pores, the remaining part of the anodic oxidation coating that is not overlapped with the synthetic resin molding is applied with paint so that a corrosion resistant paint coating is formed thereon;
    the synthetic resin having the elastic modulus that is able to absorb the difference between the linear expansion of aluminum and that of synthetic resin caused by a sudden temperature change is used as the synthetic resin for forming a synthetic resin molding.

14. The composite of claim 1 produced by a process comprising:
    (a) applying anodic oxidization treatment to both side surfaces of a plate-shaped aluminum raw material by a phosphoric acid or sodium hydroxide bath to form an anodic oxidation coating on each surface comprising innumerable pores having a diameter of between about 25 nm to about 90 nm and a depth from between about 1 μm to about 1.5 μm, is formed,
    (b) forming a print coating on one side surface of both the anodic oxidation coatings of the anodic oxidization treated aluminum material,
    (c) bending the same into second dimensions or third dimensions by press working, and
    (d) placing a portion or whole of the worked aluminum material with the anodic oxidation coatings in a cavity having a predetermined shape made in a metal mold, and injecting molten synthetic resin toward the exposed part or whole surface of the anodic oxidation coating in the cavity, so that part of the molten synthetic resin is invaded into the innumerable pores open in the surface of the anodic oxidation coating and bonded together over a part or the whole surfaces thereof and also is filled in the cavity under pressure to be molded.

15. The composite of claim 1 produced by the process comprising:
    (a) forming a printed surface on one side surface of a plate-shaped aluminum raw material,
    (b) bending the same into two dimensions or three dimensions by press working, (c) applying an anodic oxidization treatment to the unprinted other side surface of the worked aluminum raw material by an electrolysis by a phosphoric acid or sodium hydroxide bath, so that the anodic oxidation coating composed of innumerable pores having a diameter of between about 25 nm to about 90 nm and a depth from between about 1 µm to about 1.5 µm, is formed, and (d) placing the part or whole of the worked aluminum material with the anodic oxidation coatings in a predetermined shaped cavity of a metal mold, and injecting molten synthetic resin toward the exposed part or whole surface of the anodic oxidation coating in the cavity, so that part of the molten synthetic resin is invaded into the innumerable pores open in the surface of the anodic oxidation coating and bonded together over a part or the whole surfaces thereof and also is filled in the cavity under pressure to be molded.

16. The composite of claim 1 produced by the process comprising:

(a) forming a printed surface on one side surface of a plate-shaped aluminum raw material;

(b) applying an anodic oxidation treatment to the unprinted other side surface of the worked aluminum raw material by an electrolysis by a phosphoric acid or sodium hydroxide bath, so that an anodic oxidation coating composed of innumerable pores between about 25 nm from about 90 nm and a depth from between about 1 µm to about 1.5 µm, is formed, (c) bending the same into two dimensions or three dimensions by press working, (d) placing the part or whole of the worked aluminum material with the anodic oxidation coatings in a predetermined shaped cavity of a metal mold, and injecting molten synthetic resin toward the exposed part or whole of the anodic oxidation coating in the cavity, of that part of the molten synthetic resin is invaded into the innumerable pores open in the surface of the anodic oxidation coating and bonded together over a part or the whole surfaces thereof and also is filled in the cavity under pressure to be molded.

17. The composite of claim 1 produced by the process comprising: using a metal mold for injection molding provided with a heating apparatus surrounding a vertical passage connecting to a sprue in the metal mold for injection molding and a gate connecting to the lower end of the vertical.

18. The composite of claim 5, wherein the aluminum raw material is anodized in the phosphoric acid bath comprising 15-40% aqueous solutions of phosphoric acid in concentration and having a bath temperature in the range of 10-30° C., and a direct current electrolysis is carried out for 5-25 minutes, at a voltage of 20-100V, at a current density of 0.5-2 A/dm$^2$, so that the anodic oxidation coating having the innumerable pores having a diameter from between about 30 nm to about 90 nm and a depth from between about 1 µm to about 1.5 µm is formed.

19. The composite of claim 5, wherein the aluminum raw material is anodized in a bath comprising 0.05-0.3 mol aqueous solutions of sodium hydroxide, and having a bath temperature in the range of 10-30° C. and a direct current electrolysis is carried out for 5-25 minutes, at a voltage of 15-45V, at a current density of 0.5-3 A/dm$^2$, so that the anodic oxidation coating having the innumerable pores having a diameter of between 25 nm to about 90 nm and a depth from between about 1 µm to about 1.5 µm is formed.

20. The composite of claim 5, wherein the aluminum raw material in the shape of a plate or a worked aluminum raw material bent into two or three dimensions by press working is used, and the synthetic resin mold is coupled with the partial or whole surface of the anodic oxidation coating thereof by injection molding.

* * * * *